(12) United States Patent
Lightfoot

(10) Patent No.: US 7,707,737 B2
(45) Date of Patent: May 4, 2010

(54) PORTABLE THREE DIMENSIONAL MEASURING DEVICE

(76) Inventor: Caren Michele Davis Lightfoot, 11372 Musette Cir., Alpharetta, GA (US) 30004

( * ) Notice: Subject to any disclaimer, the term of this patent is extended or adjusted under 35 U.S.C. 154(b) by 0 days.

(21) Appl. No.: 12/079,165

(22) Filed: Mar. 24, 2008

(65) Prior Publication Data

US 2008/0229601 A1 Sep. 25, 2008

Related U.S. Application Data

(60) Provisional application No. 60/919,735, filed on Mar. 23, 2007.

(51) Int. Cl.
*G01B 5/00* (2006.01)
*G01B 3/08* (2006.01)

(52) U.S. Cl. .......................... 33/700; 33/809

(58) Field of Classification Search ............... 33/464, 33/700, 701, 759, 760, 764, 809; 248/163.1, 248/168, 169, 170, 171, 173, 188.5, 431
See application file for complete search history.

(56) References Cited

U.S. PATENT DOCUMENTS

| | | | | |
|---|---|---|---|---|
| 4,150,733 A | * | 4/1979 | Plummer | 248/168 |
| 5,357,683 A | * | 10/1994 | Trevino | 33/764 |
| 5,979,068 A | * | 11/1999 | Andrews | 33/520 |
| 6,223,446 B1 | * | 5/2001 | Potter | 33/764 |
| 2002/0088134 A1 | * | 7/2002 | Watts | 33/760 |
| 2005/0223582 A1 | * | 10/2005 | Baugh | 33/764 |
| 2006/0118681 A1 | * | 6/2006 | Crain et al. | 248/170 |
| 2007/0107249 A1 | * | 5/2007 | Marocco et al. | 33/760 |
| 2008/0224000 A1 | * | 9/2008 | Yang | 248/188.5 |
| 2009/0056159 A1 | * | 3/2009 | Plucknett | 33/760 |

* cited by examiner

*Primary Examiner*—G. Bradley Bennett
(74) *Attorney, Agent, or Firm*—Robert Z. Evora

(57) ABSTRACT

A three dimensional measuring device including: a first retractable member for measuring in a first dimension, a second retractable member for measuring in a second dimension, and a third retractable member for measuring in a third dimension. Each of the retractable members is configured to angularly pivot relative to any of the other retractable members thereby rendering a recordable angular measurement. The three dimensional measuring device is adapted to accurately measure the size of three dimensional objects. The three dimensional measuring device is also capable of rendering a three dimensional representation of the object.

20 Claims, 22 Drawing Sheets

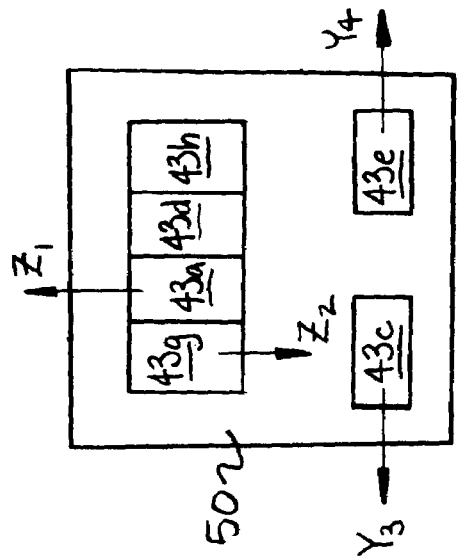
FIG. 27
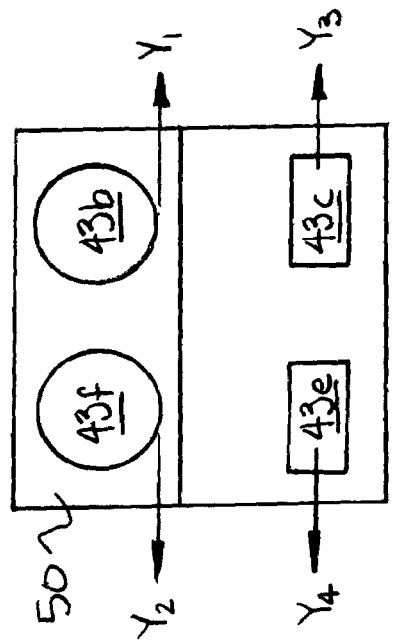
FIG. 28
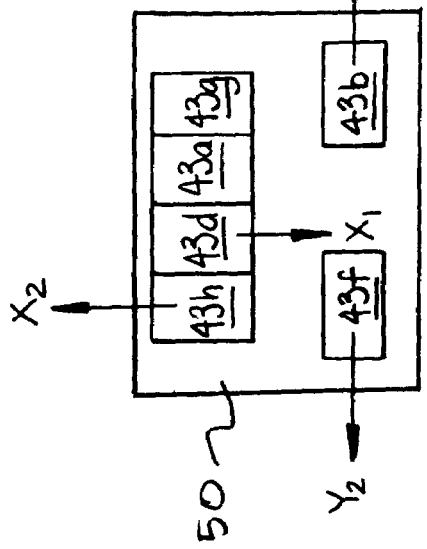
FIG. 25
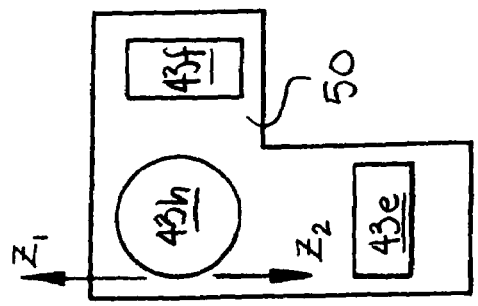
FIG. 24
FIG. 26

$X_1 = 3.5$ FT
$X_2 = 3.5$ FT
$Y_1 = 3.5$ FT
$Y_2 = 3.5$ FT

POSITION P1 DISPLAY $X_1 = 2.75$ FT
$X_2 = 4.25$ FT
$Y_1 = 4.0$ FT
$Y_2 = 3.0$ FT

POSITION P2 DISPLAY $X_1 = 5.5$ FT
$X_2 = 1.5$ FT
$Y_1 = 6.25$ FT
$Y_2 = 0.75$ FT

POSITION P3 DISPLAY

PORTABLE THREE DIMENSIONAL MEASURING DEVICE

CROSS REFERENCE TO RELATED APPLICATION

This application is a Non-Provisional Application which claims the benefit of the filing date of U.S. Provisional Application Ser. No. 60/919,735, entitled "Portable Three Dimensional Measuring Device" filed Mar. 23, 2007, the entirety of which is incorporated herein by reference.

BACKGROUND OF THE INVENTION

1. Field of the Invention

The instant invention relates to a portable device to accurately measure an object in at least three dimensions.

2. Description of the Related Art

It is common for interior designers, home owners and the like to measure the size of objects and furniture in an attempt to recognize if the object will fit into a desired space. This has often been accomplished by using a single axis tape measure, taking three different measurements along the x, y and z axis and creating a three dimensional drawing of the object to compare to furniture items to be purchased with the desired placement in the home. The difficulty of this method is that it is problematic to get an accurate comparison of the size of the object in relation to the desired space.

Various means are used to account for the distance from the device to the floor and measurements may not be exact. Many of the prior art devices require the assistance of another person to take the measurement, and most do not provide enough space to record data such as the date, name of subject and other desired information.

There is a need for a measuring device that gives an accurate measurement of the subject and one that the subject can use alone. There is a need for such a measuring device that also provides sufficient space to record any necessary data with each measurement. There is also a need for a measuring device that does not have to be attached to a wall in order to get an accurate measurement and can be stored and brought out only when needed.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The present invention provides a measuring device that can accurately measure and record the size of furniture objects. The device also has space to mark and record the size as well as to note pertinent information such as, but not limited to the name of the object being measured and the date of the measurement.

It is an object of the present invention to provide a measuring device that can give an accurate representation of the object being measured.

Another object of the present invention is to provide a device that a person can use with out the assistance of another person.

A further object of the present invention is to provide a measuring device that has sufficient space and/or means to record a measurement and other significant data on the device.

A still further object of the present invention is to enable the device to be used without the necessity of mounting the device on a wall or other vertical structure.

Another object of the present invention is to provide a measuring device that consists of parts which can be separated from one another for storage.

It is also an object of the present invention to provide a device that has a movable member that can be securely maintained at the exact point of the measurement to facilitate the recording of the measurement and other data at the proper location.

The present invention provides a device for measuring the size of furniture that comprises a pivotal rigid base member having at least three extendable members to measure the x, y and z axis, each of the three extendable members having measurement markings thereon.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein:

FIG. 24 is a front view illustration for an exemplary bias tape reel system for the three dimensional measurement device in accordance with this invention.

FIG. 25 is a top view illustration for the exemplary bias tape reel system for the three dimensional measurement device in accordance with this invention.

FIG. 26 is a left side view illustration for the exemplary bias tape reel system for the three dimensional measurement device in accordance with this invention.

FIG. 27 is a right side view illustration for the exemplary bias tape reel system for the three dimensional measurement device in accordance with this invention.

FIG. 28 a back view illustration for the exemplary bias tape reel system for the three dimensional measurement device in accordance with this invention.

DETAILED DESCRIPTION OF EXEMPLARY EMBODIMENTS

Figure 1:
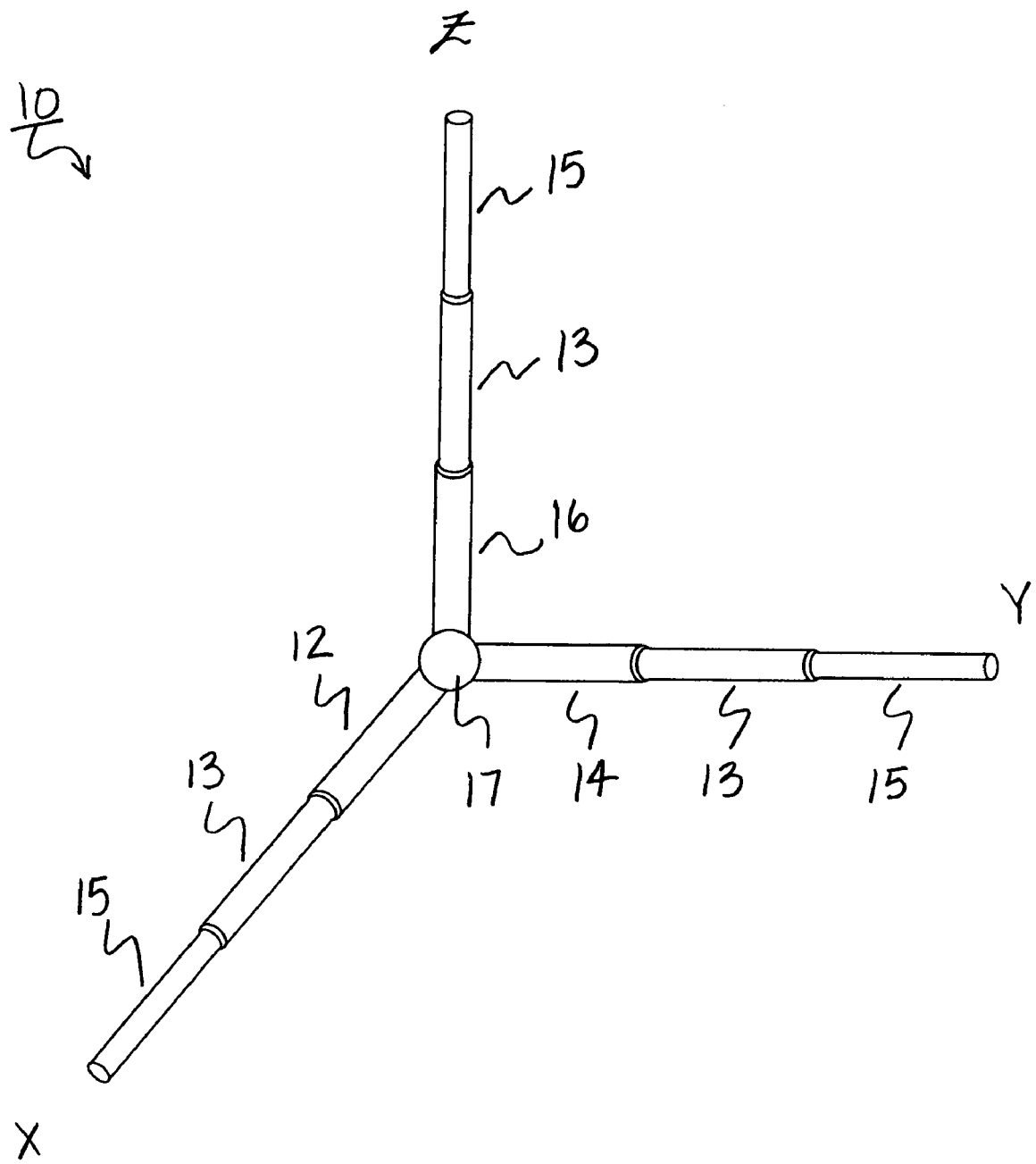
FIG. 1 illustrates an exemplary three dimensional measuring device in accordance with this invention.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example.

The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Particular embodiments of the present invention will now be described in greater detail with reference to the figures.

FIG. 1 illustrates an exemplary three dimensional measuring device 10 in accordance with this invention. The three dimensional measuring device 10 is adapted to provide measurement of objects, such as obtuse large objects in three dimension that are otherwise difficult to measure. For example, the three dimensional measuring device 10 may be used by an interior decorator or user to measure the landscape of a room in three dimensions so that the decorator can appropriately design the interior living spaces of the room being measured.

The three dimensional measuring device 10 includes a first member 12, a second member 14 and a third member 16, al for taking independent measurements of at least three dimensions. According to this example, the three directions are labeled by axis X, Y and Z. Each of the various members 12, 14, 16 includes a first extension member 13 and a second extension member 15.

The various members 12, 14, 16 may be extendable in a plurality of different ways. For example, the members 12, 14, 16 may be constructed of a telescopic frame construction as shown in FIG. 1. In the alternative, the members 12, 14, 16 may be extended similar in construction to a conventional one-dimensional tape measurer which includes a retractable reel frame that is biased to retract into the body casing of the one-dimensional tape measure. This feature will be described in more detail later with respect to FIG. 18.

FIG. 1 also shows a pivot joint 17 disposed between each of the members 12, 14, 16. The pivot joint 17 is configured to provide the maximum range of three dimensional motion for each of the members 12, 14, 16. The pivot joint 17 may be made from a variety of different pivot joints, such as a universal joint, a joint including a track onto which each of the members 12, 14, 16 can translate. Any type of pivoting three dimensional joint, now known or later discovered, in accordance with this invention is contemplated.

Figure 2:
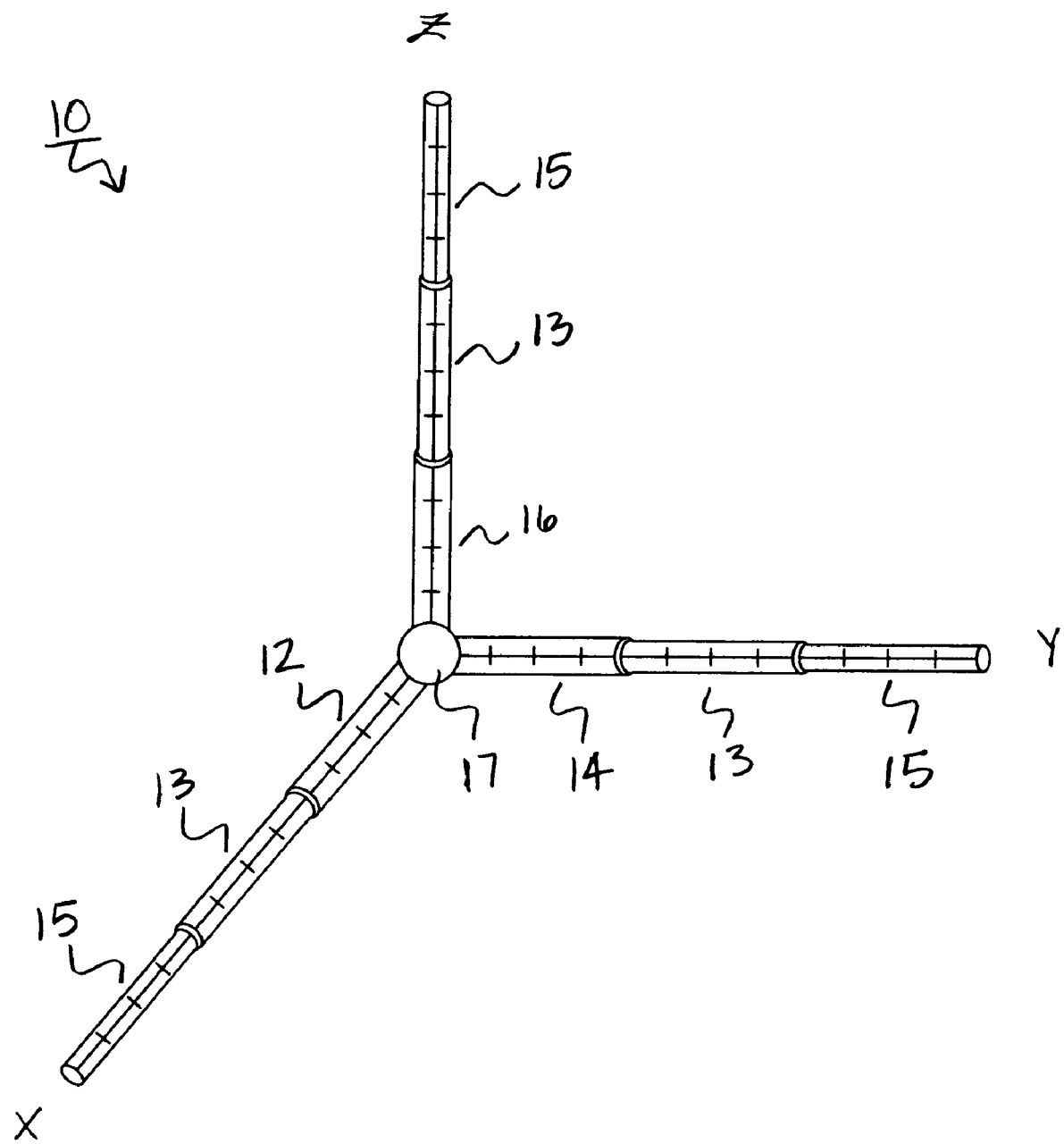
FIG. 2 illustrates an exemplary three dimensional measuring device with the inclusion of measurement indicators labeled on the measurement device in accordance with this invention.

FIG. 2 illustrates the exemplary three dimensional measuring device 10 including measurement indicators labeled on the device. The measurement indicators may include linear marks to represent inches, feet, yards, meters, and/or any other type of measurement.

Figure 3:
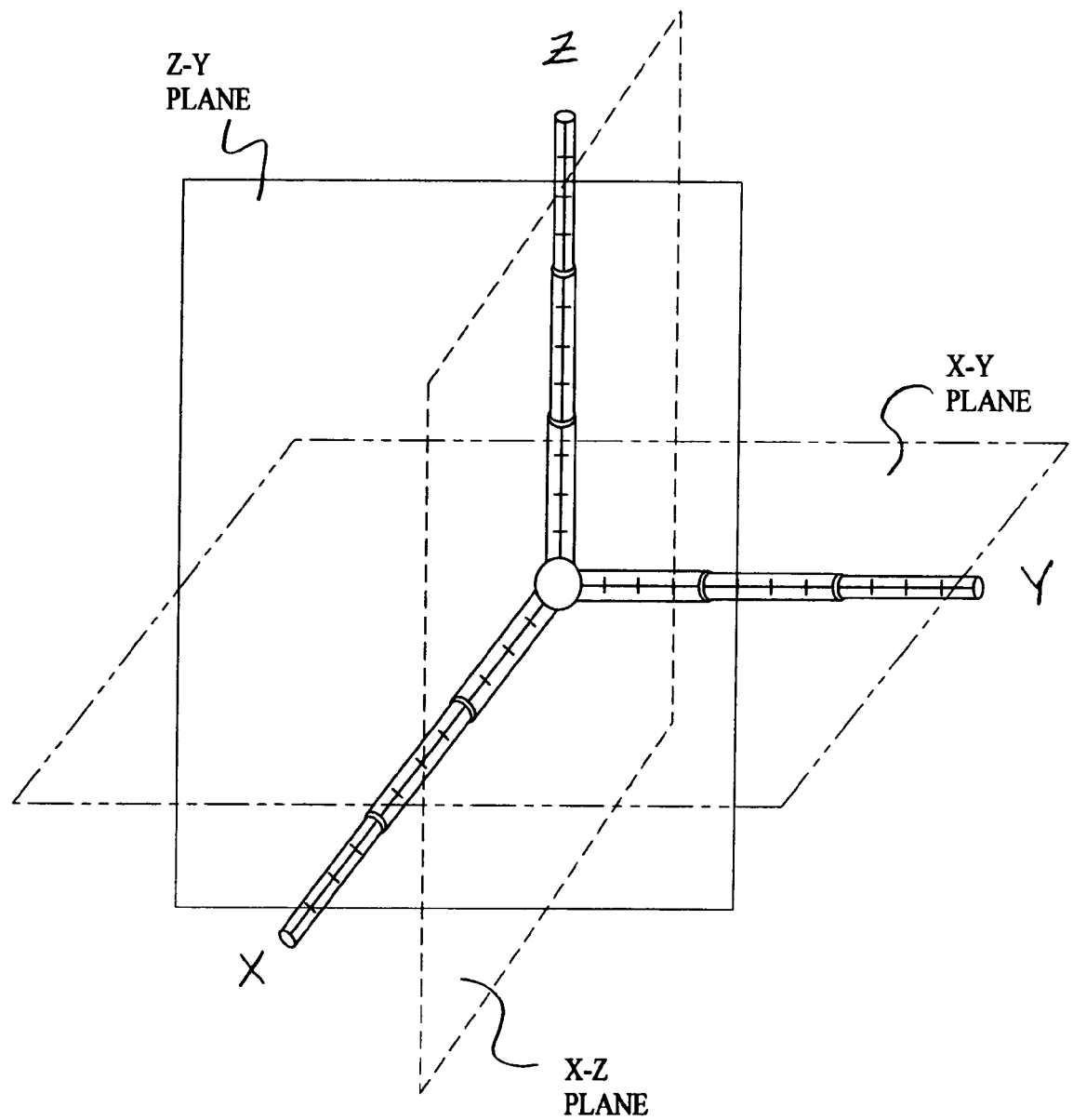
FIG. 3 depicts an illustration of the three dimensional measuring device usable in at least three dimensions of space in accordance with this invention.

FIG. 3 shows the range of motion in which the three dimensional measuring device 10 may operate. As shown, any one of the members 12, 14, 16 is flexible and may translate and/or extend in any one of the three dimensional planes (X-Y plane, Y-Z plane or X-Z plane). By way of illustration, FIG. 4 is provided to show the versatility of the invention.

Figure 4:
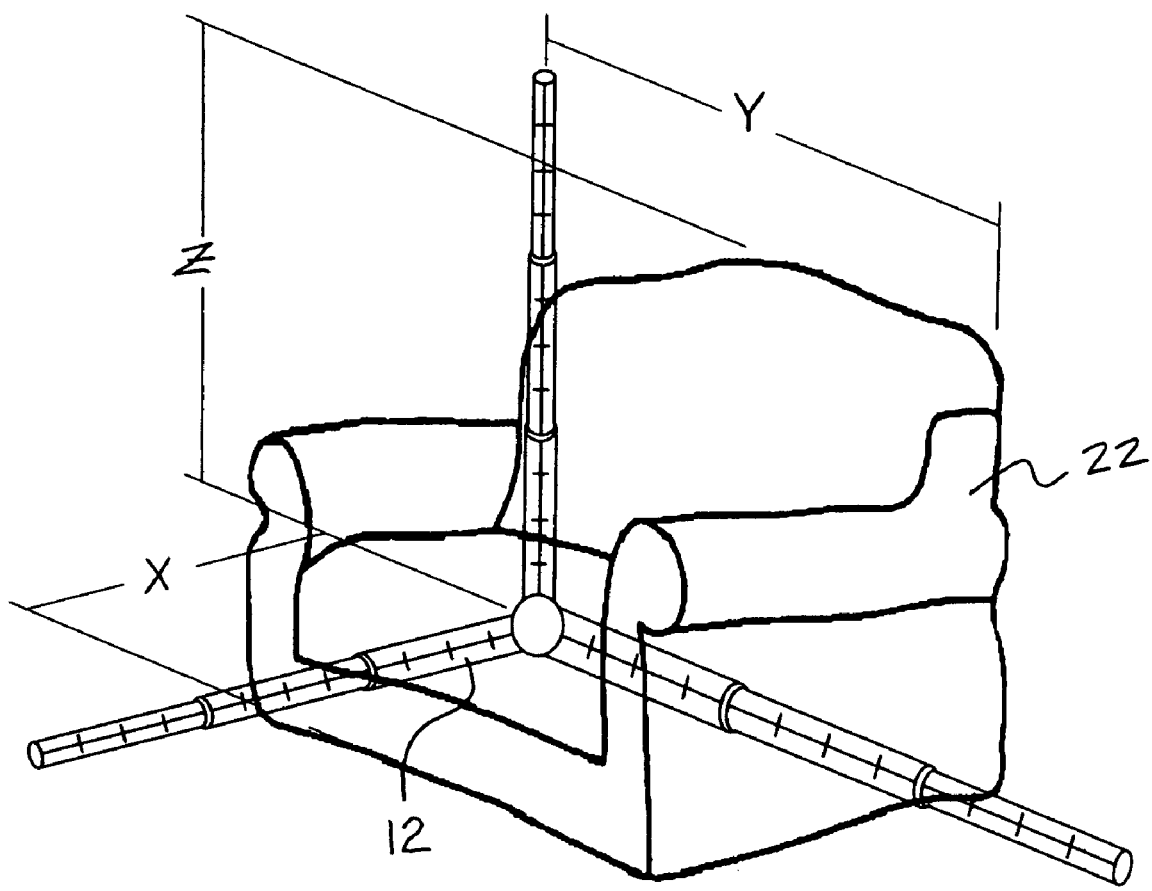
FIG. 4 demonstrates using the three dimensional measuring device to measure a large obtuse object such as a chair from a lower corner of the object in accordance with this invention.

FIG. 4 demonstrates using the three dimensional measuring device 10 to measure a large obtuse object such as a chair 22. The chair 22 is measured from a lower corner of the chair 22. In operation, the three dimensional measuring device 10 is butt up against one of the corners of the chair 22 and measurements are taken. In the X-direction, the first member 12 is disposed adjacent to an edge of the chair 22 and the X measurement is taken from the back to the front lower corner of the chair 22. The Y-direction measurement is similarly taken by the second member 14 along the a second lower edge of the chair 22. Likewise, the Z-direction measurement is measured from the base of the three dimensional measuring device 10 to a top edge of the chair 22.

Use of this dimension is an advantage when a user desires to match an object at a remote location where the chair cannot be easily transported, such as in a furniture store when the user desires to purchase a new piece of furniture to fit in within the space requirements measured. The user can now take out their collapsible three dimensional measuring device 10 and extend it to mimic the size and shape of the piece of furniture and to choose another piece that may be more desirable then the older dated piece that they wish to replace. The advantage to having this three dimensional measuring device 10 is that the user can quickly and easily compare the measurements and make a proper selection with the fear of choosing a piece of furniture that may be the wrong size because the user can measure the actual dimensions of the new piece right in the store to ensure its size and shape. The three dimensional measuring device 10 is adaptable for taking measurements of various types of objects from various angles.

Figure 5:
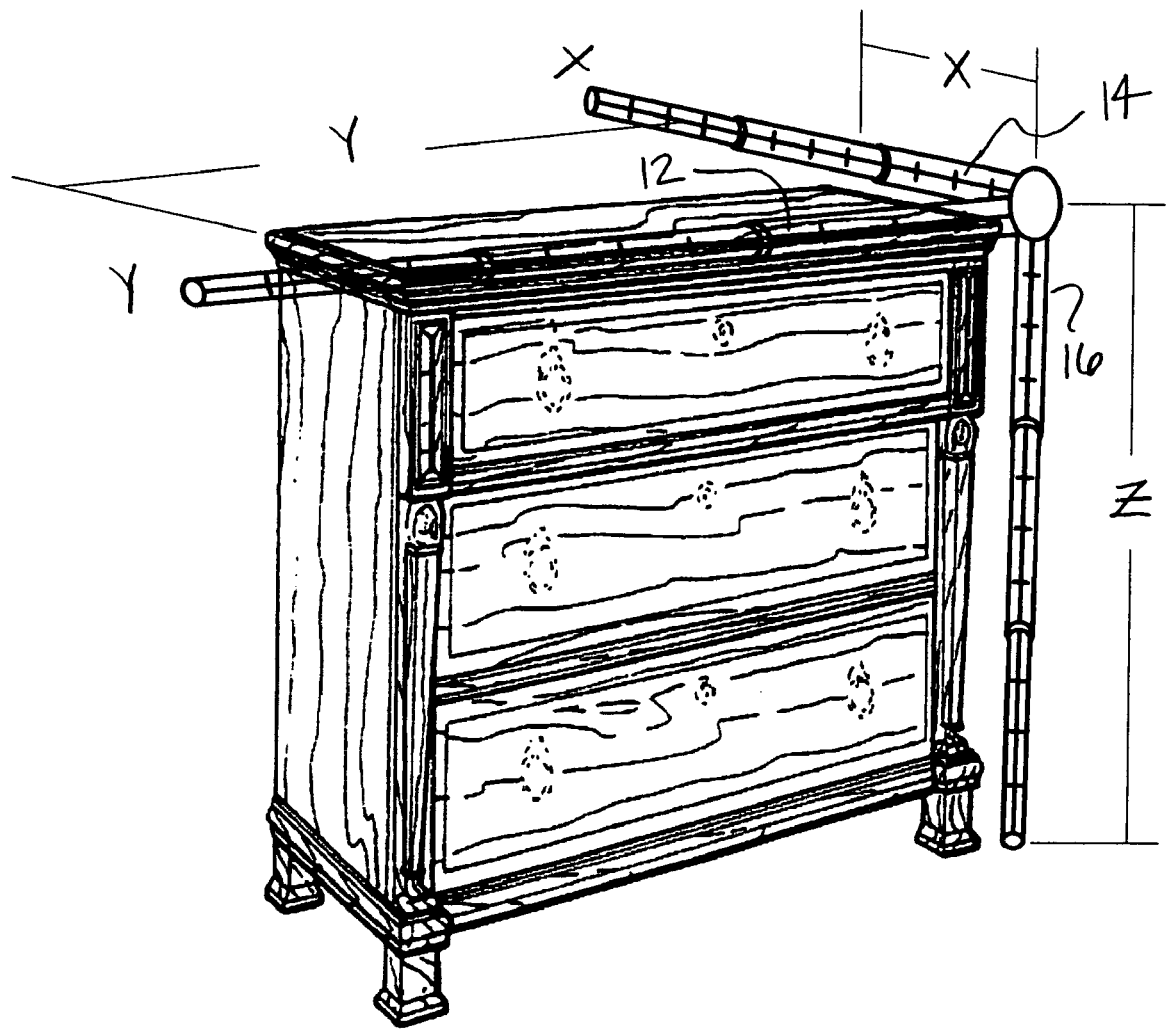
FIG. 5 demonstrates the versatility in measuring a large obtuse object such as a file cabinet from an upper corner of the object in accordance with this invention.

FIG. 5, for example, demonstrates the versatility in measuring a large obtuse object such as a file cabinet 24 from an upper corner of the object in accordance with this invention. This is an advantage, especially when large objects are adjacent to a wall and it may be difficult to measure from the back side of the object. As shown, the three dimensional measuring device 10 may be place at a suitable location at the front upper end of the file cabinet 24 and various measurements may be taken.

In the X-direction, the first member 12 is disposed adjacent to an upper edge of the file cabinet 24 and the X measurement is taken across the top edge of the file cabinet 24. In the Y-direction, the measurement may be similarly taken by the second member 14 along a second upper edge of the file cabinet 24. And, in the Z-direction, a measurement may be taken from the front of the file cabinet 24 from the top to the bottom of the file cabinet 24 of the three dimensional measuring device 10.

Figure 6:
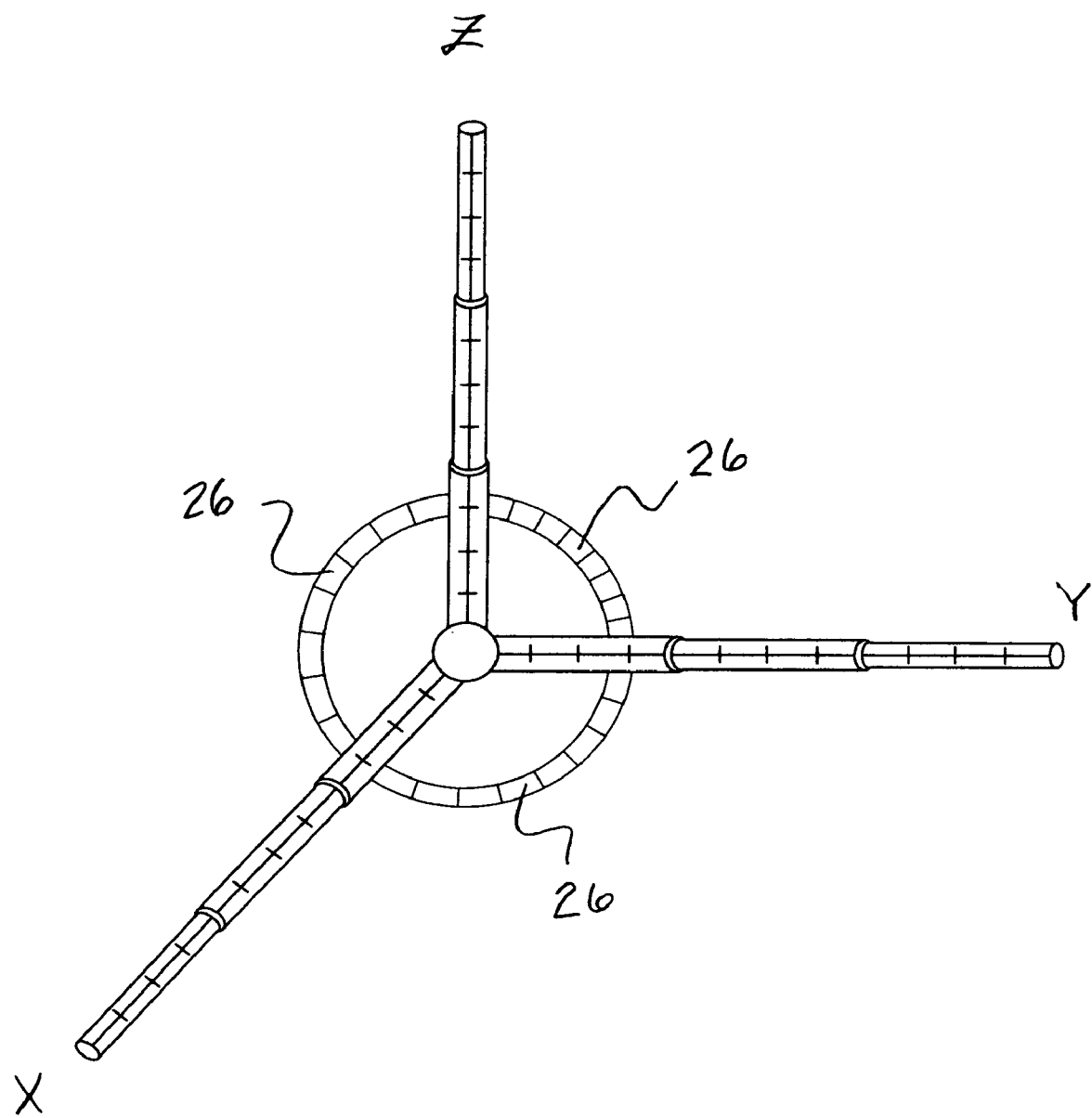
FIG. 6 illustrates the three dimensional measuring device incorporating an angular protractor feature in accordance with this invention.

FIG. 6 illustrates the three dimensional measuring device 10 incorporating an angular protractor 26 in accordance with this invention. The angular protractor 26 may be disposed between any two extendable members 12, 14, 16 to determine an angular measurement between the two member. The angular protractor 26 may be configured to be retractably disposed with any one of the member 12, 14, 16 much like a foldable accordion fan would be retracted and extended in accordance with this invention. Alternatively, the angular protractor 26 may be a separate unit that may be attached and detached when angular measurements are desired. Alternatively, the angular protractor 26 feature may be embedded in the pivot joint 17.

Figure 7A:
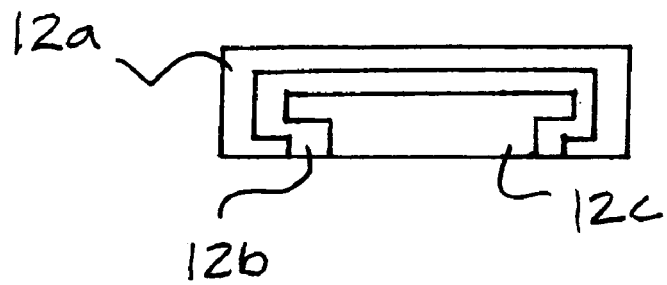
FIGS. 7A and 7B illustrate another exemplary configuration for at least one of the extendable members of the three dimensional measuring device in accordance with this invention.
Figure 7B:
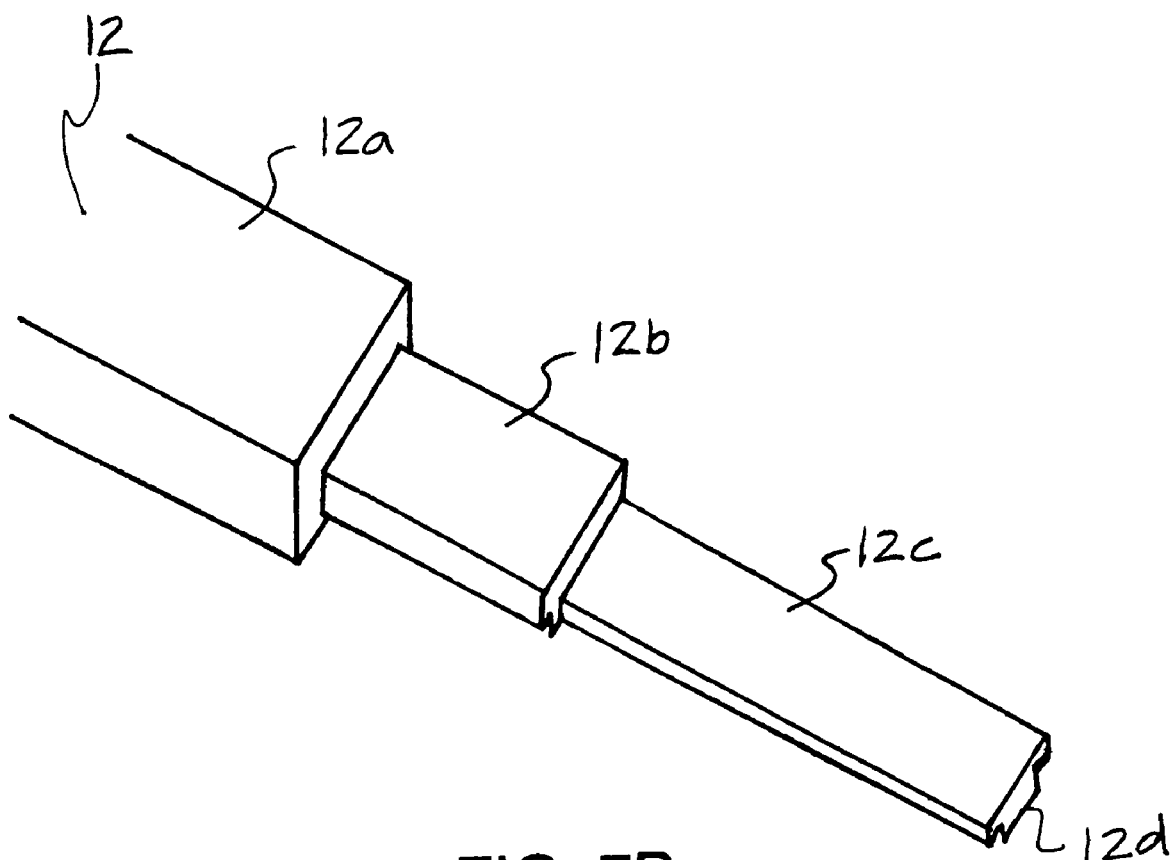

FIGS. 7A and 7B illustrate another exemplary configuration for at least one of the extendable members of the three dimensional measuring device in accordance with this invention. The extendable members 12, 14, 16 may be made of any number of constructions. FIGS. 7A and 7B depicts an extendable members 12a including a first extendable member 12b and a second extendable member 12c. FIG. 7A illustrates an end view of the extendable members 12a, 12b and 12c. As shown, the lower end of the extendable members 12a, 12b, 12c all rest against one plane. For measurement purposes, more accurate measurements may be taken according to this embodiment. It is to be understood that various shapes and sizes may be incorporated in accordance with this invention and the figures are not intended to limit the configuration of any of the extendable member 12, 14, 16.

Further, the second extendable member 12c can have an end tab 12d, that is configured such that the end tab 12d remains in place as measurements are being taken. For example. End tab 12c can be flexible, coated with rubber, have sharp teeth or be made longer by a retractable telescopic means.

Figure 8:
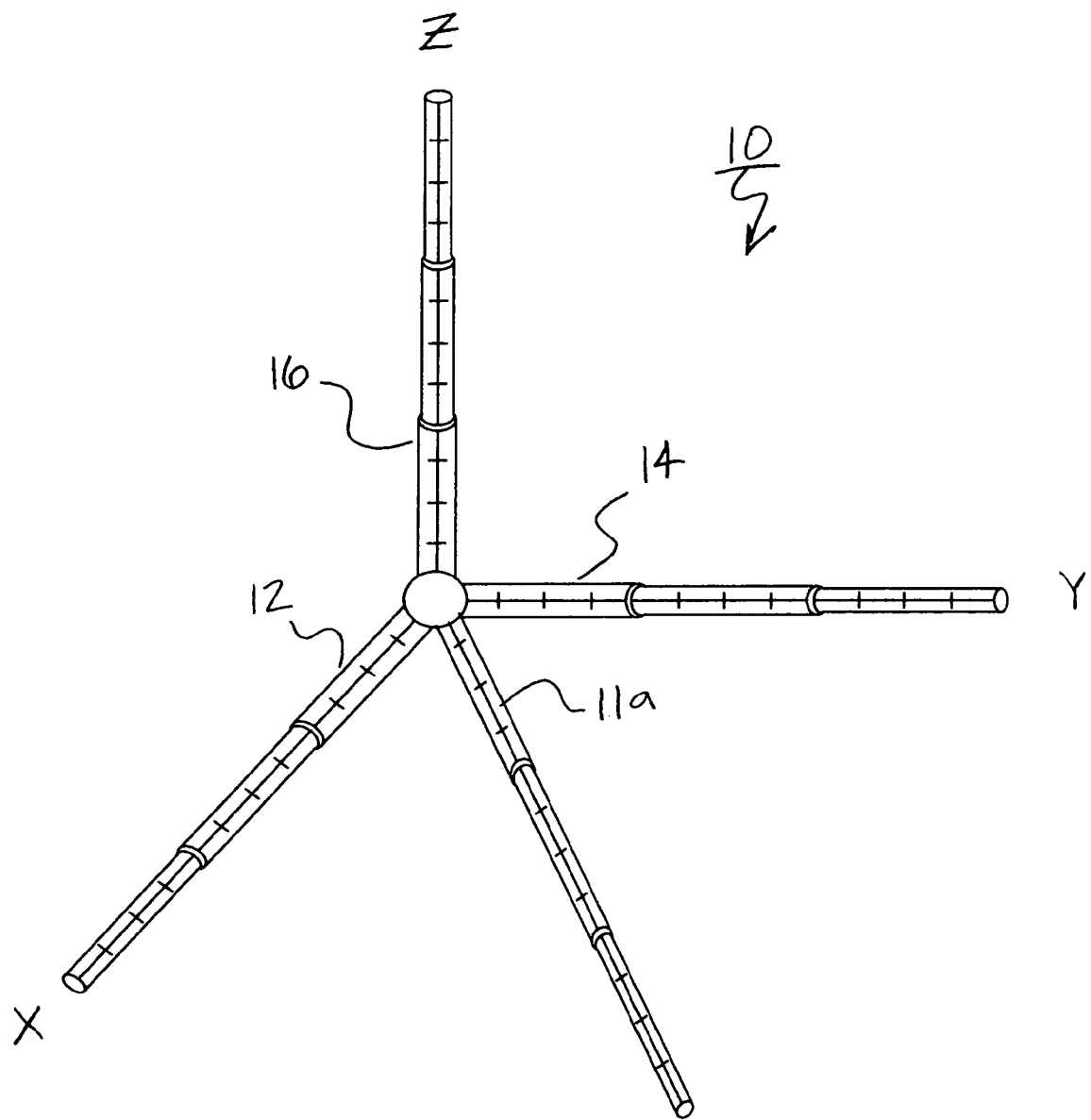
FIGS. 8 and 9 depict a three dimensional measuring device including a fourth and fifth extendable measurement device in accordance with this invention.
Figure 9:
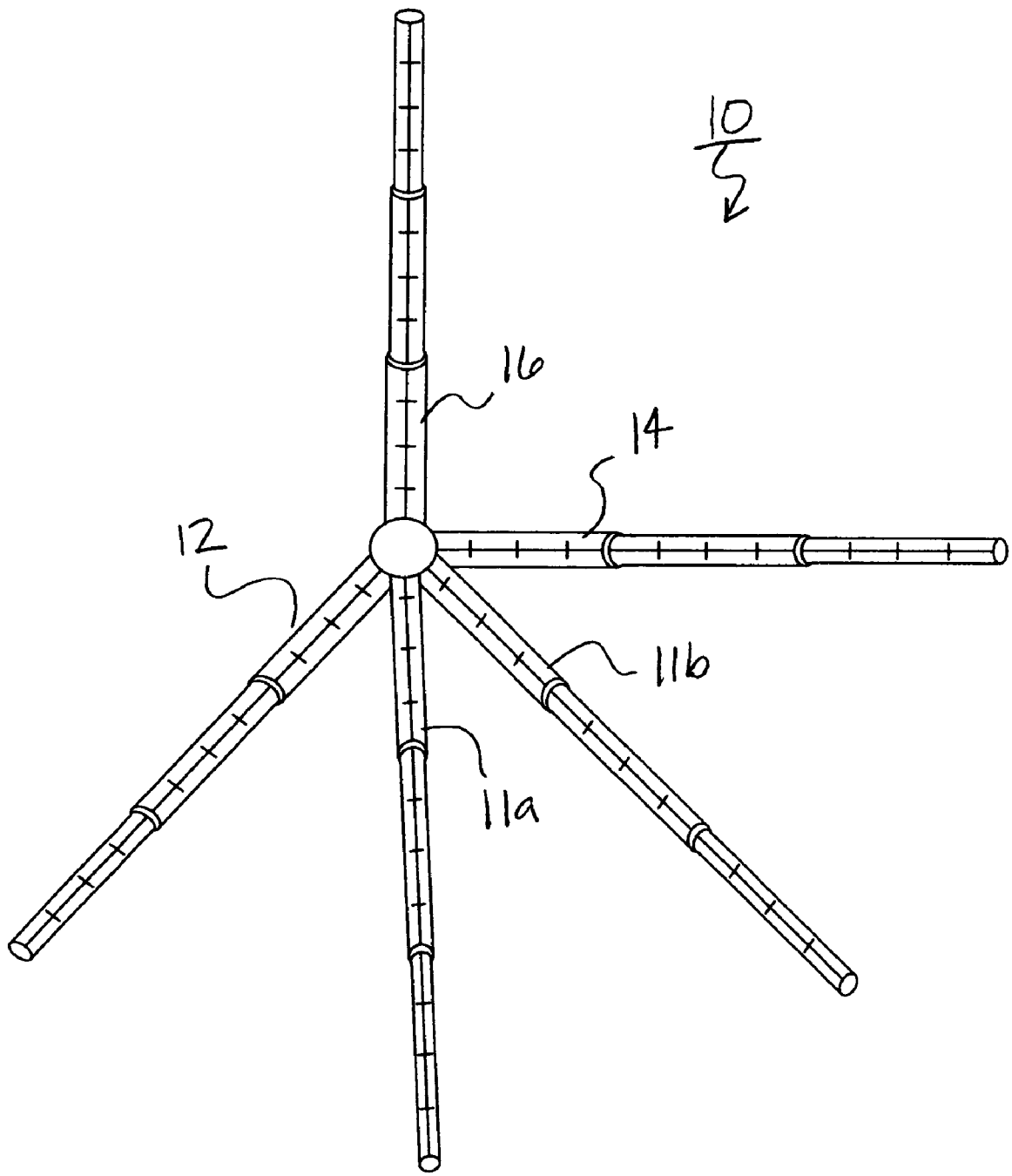

FIGS. 8 and 9 depict a three dimensional measuring device 10 including a fourth extendable member 11a and fifth extendable member 11b into the three dimensional measuring device 10 in accordance with this invention. The advantage of this configuration is that number of measurements simultaneously taken may be increased to lend to the user a better rendition of the object being measured.

Figure 10:
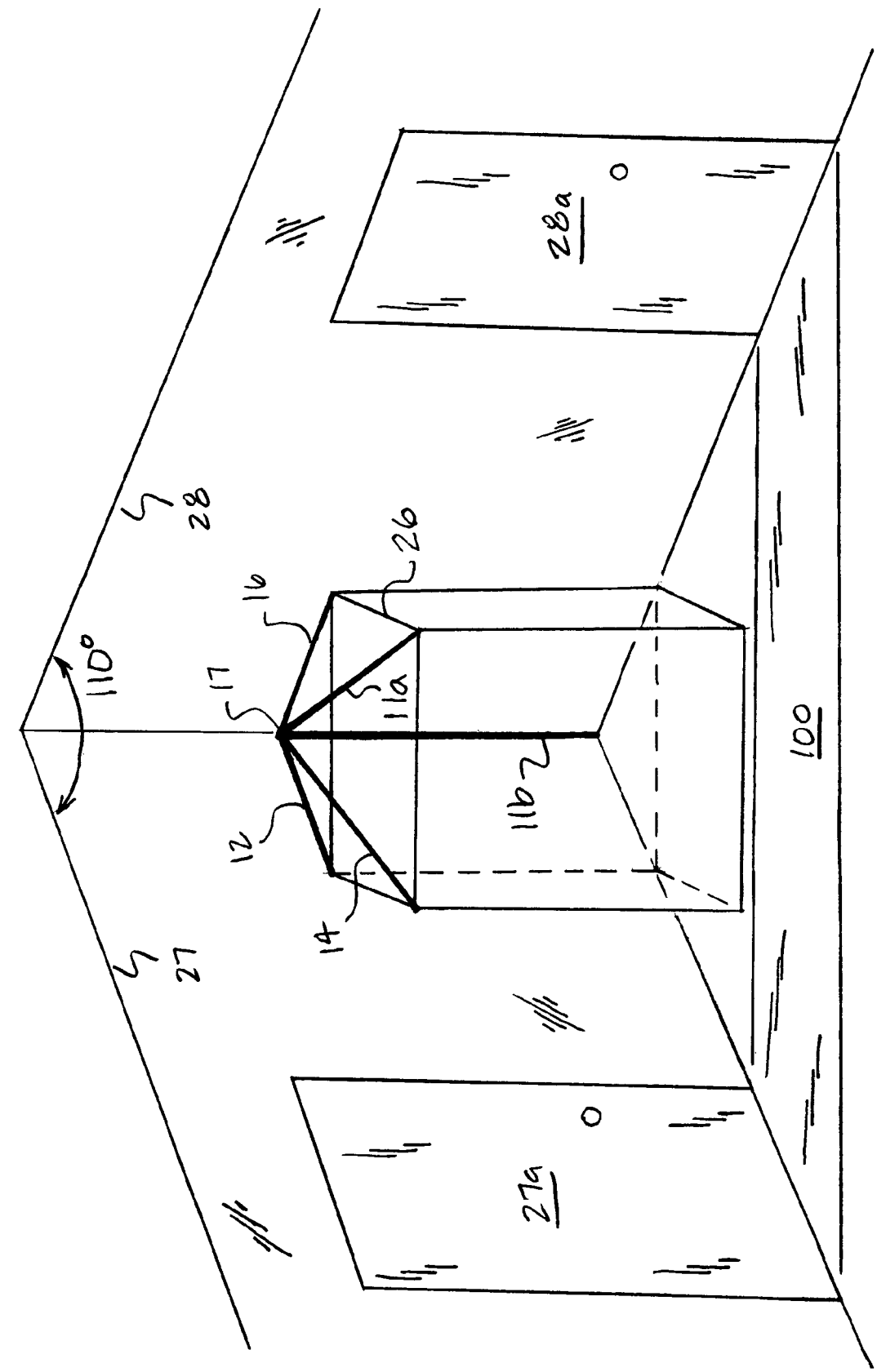
FIG. 10 demonstrates an exemplary use for a three dimensional measuring device with a plurality of legs for measuring a large object in accordance with this invention.

FIG. 10, for example, demonstrates an exemplary use for a three dimensional measuring device with a plurality of legs for measuring a large object in accordance with this invention. As shown, the large object 26 being measured may employ the use of at least four extendable members 12, 14, 16, 11a and 11b (all shown as solid lines for ease of illustration). In the scenario shown in FIG. 10, the footprint and height of the object 26 are unknown and the user would like to measure the object 26 to replace it with another piece of furniture within substantially similar dimensions of the object 26 already present.

The object 26 is sized and oriented to fit between the space confined between the two walls 27 and 28 oriented at an odd angle (say for example 110 degrees) relative to one another. Normal foot traffic would move between door openings 27a and 28a along path shown by carpet 100. The size and strategic positioning of the object 26 must be chosen so that the normal footpath 100 will not be impeded by the furniture object 26. Since the space within that area is an odd shape, a user or for example interior designer would like to be able to easily determine the dimensions in that area confines. The instant three dimensional measuring device 10 could assist the user to understand those dimensions.

In operation, the user may place the pivot joint 17 of the three dimensional measuring device 10 up into the corner between two walls 27, 28 and may extend the four extendable members 12, 14, 16 and 11a, of the three dimensional measuring device 10 to measure the footprint of the object 26. Likewise, the height of the object 26 may be measured with the fifth extendable member 11b from the pivot joint 17 downward to the floor. Without the use of a three dimensional measuring device, this measurement would have been very difficult to measure because the object was too close to the oddly oriented walls 27, 28 and it would not be possible to get behind the object 26. In this example, the measurement of the object can easily be taken over the top of the object 26. Likewise, a similar measurement may have been taken at a variety of different places adjacent to the object 26 which would have also been easy to calculate due to the versatility of the three dimensional measuring device 10.

Although this invention has been discussed with respect to the dimensions of an object, it is also to be understood that the three dimensional measuring device 10 can optimally provide dimensions for any type of distance measurement, such as for example, the distance an object may be from another wall and the like. The possible uses for the three dimensional measuring device 10 are limitless.

Figure 11:
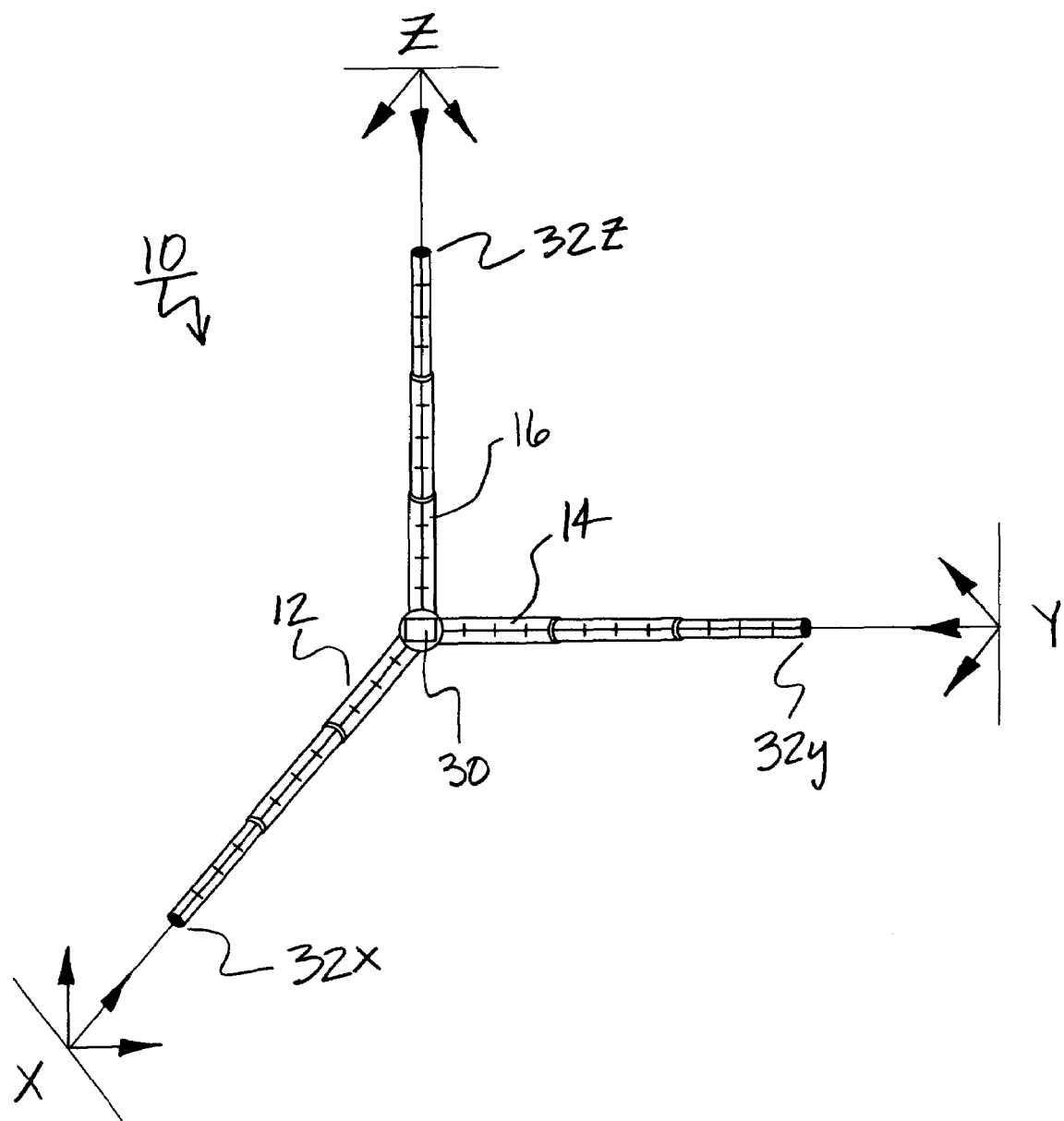
FIG. 11 illustrates another exemplary configuration for the three dimensional measuring device including a laser measurement system in accordance with this invention.
Figure 12:
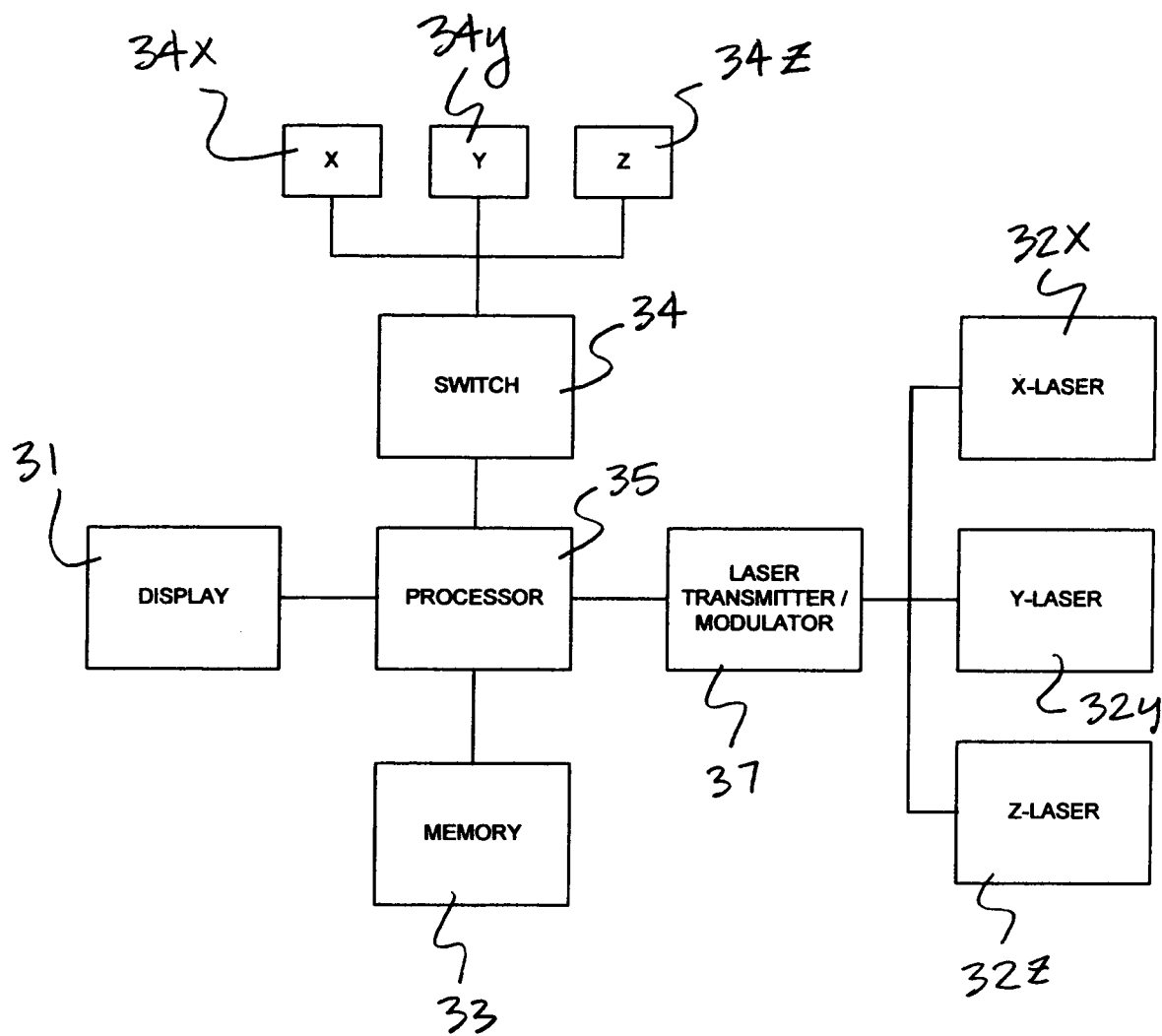
FIG. 12 depicts the embedded electronic control system of the laser measuring device in accordance with this invention.

FIGS. 11 and 12 illustrate another exemplary configuration for the three dimensional measuring device 10 incorporating a laser measurement system 30 in accordance with this invention. In FIG. 11, various lasers 32x, 32y, 32z are located within each of the members 12, 14, 16. The object of using the lasers 32x, 32y, 32z is to provide another method for taking measurements. The laser measurement system 30 is useful in large spaces, such as in a large room with vaulted ceilings. Since it is more difficult to measure a room with vaulted ceilings, the laser measurement system 30 can easily measure a desired distance along the longitudinal axis of an extendable member 12, 14, 16.

FIG. 12 depicts an embedded electronic control system for the laser measurement system 30. As shown, a plurality of switches 34x, 34y, 34z are provided on each of the various extendable members 12, 14, 16. The various switches 34x, 34y, 34z are connected to a processor 35. The processor 35 is electrically connected to a display 31, memory 33 and a laser transmitter 37.

In operation, when the user desires to take a first dimension in an X-direction, he would initiate the measurement by selecting the X dimension switch 34x. A signal would be transmitted to the processor 35 to take an X-measurement and the processor would send instructions to the laser transmitter 37 to activate the X-laser 32x. The X-laser 32x would then transmit the laser out to the object in line with the longitudinal axis of the x extendable member 12. The light illuminated by the laser would be reflected back from the object that the laser is striking back to the x-laser which would incorporate a light sensor. The return illumination source would be transmitted to the laser transmitter and the processor 35 would determine the distance that the impeding object is away from the X-laser to yield an x distance. Likewise, all of the measurements from each of the extendable members 14, 16, and the like, would be determined similarly. The display 31 may be user as a user interface, either with a plurality of buttons or a touch screen for operating the various dimensional measurements. The display can also display the results of the measurements. The results may be stored in memory for use or review at a later time. The processor 35 can display the measurements in any type of measurement units, including for example US standards or according to the metric system.

According to this invention, a processor 35 may be implemented at various elements of this three dimensional measuring device 10. The processor 35 may be implemented as a programmed general purpose computer, on a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device processor capable of implementing the therapeutic functions shown in the figures can be used according to this invention. The particular form taken for the processor 35 is a design choice and will be obvious and predicable to those skilled in the art.

The processor 35 of the three dimensional measuring device 10 can be associated with a storage unit (not shown) using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like. The processor 35 of the three dimensional measuring device 10 is programmable.

Figure 13:
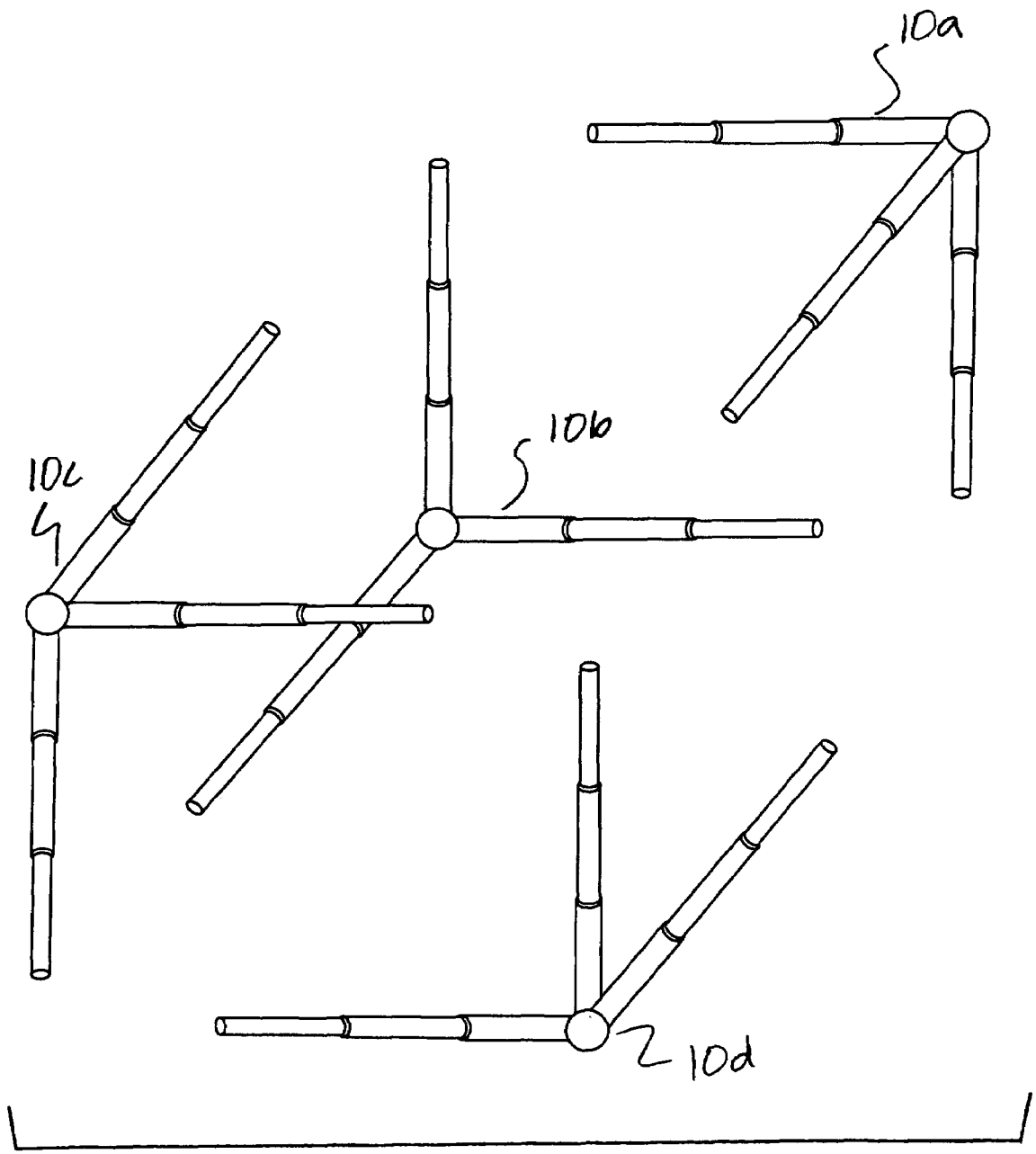
FIG. 13 illustrates an exemplary arrangement for potentially interconnecting various three dimensional measurement devices to model the size of an object accordance with this invention.

FIG. 13 illustrates an exemplary arrangement for potentially interconnecting various three dimensional measuring devices 10 to model the size of a preferred object in accordance with this invention. In particular, four three dimensional measuring devices 10a, 10b, 10c and 10d are arranged in a perspective view to show their relative position to each other prior to being connected to each other.

Figure 14:
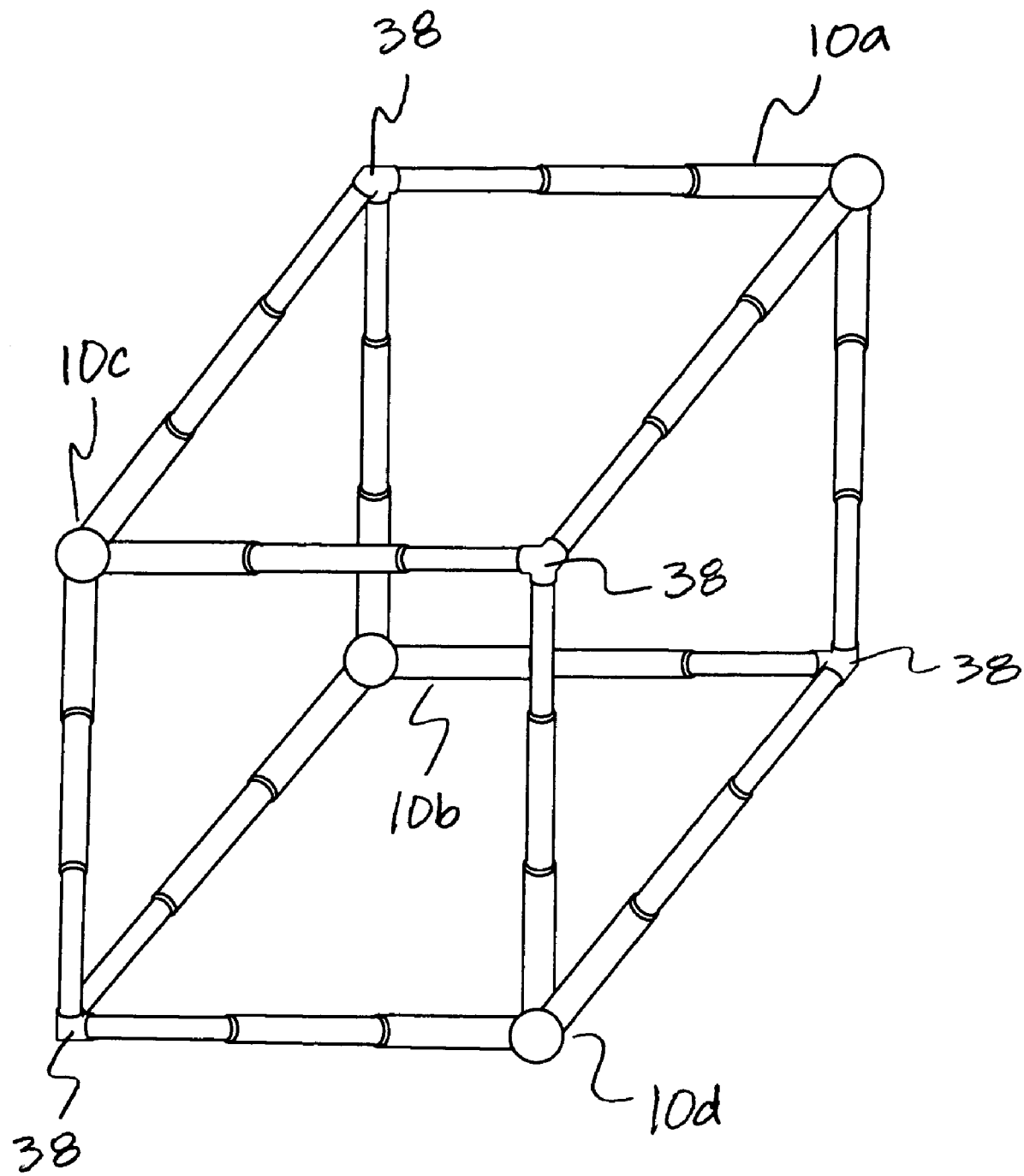
FIG. 14 illustrates an exemplary arrangement for interconnecting the various three dimensional measurement devices with a connector to simulate an accurate modeling of the size of an object accordance with this invention.

FIG. 14 depicts the various three dimensional measuring devices 10a, 10b, 10c and 10d connected together to mimic a three dimensional object. At each of the ends of the outermost second extended members 15, a connection is made with another set of second outermost second extended members 15 from a different three dimensional measuring device. The connection is secured through a connector 38 between the various three dimensional measuring devices 10a, 10b, 10c, 10d. It is also to be understood that the outermost second extended members 15 may be directly attached to each other without a connector 38. A fastener may be disposed directly onto the outermost second extended members 15 which allows the ends to meet with each other. Various types of connections may be made, including but not limited to, Velcro, a mechanical connection and any other type of connection now known or later developed in accordance with this invention. The three dimensional object modeled by the various three dimensional measuring devices 10a, 10b, 10c, 10d connected together may be extended or contracted (while connected together as shown in FIG. 14) to fit with a preferred shape.

Figure 15:
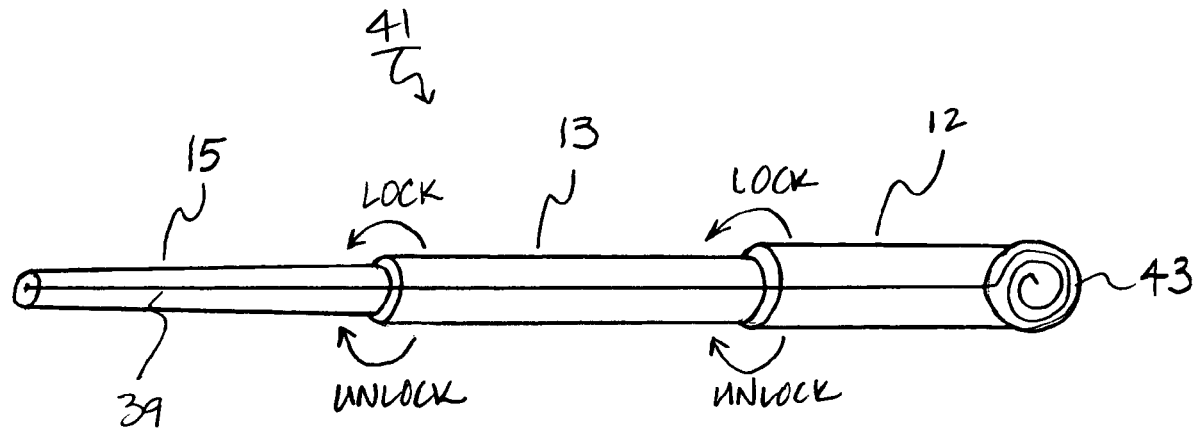
FIG. 15 demonstrates the use of the three dimensional measurement devices to measure the circumference of a curved object in accordance with this invention.

FIG. 15 illustrates an exemplary system for extending, locking and retracting the extendable member 12 of the three dimensional measuring device 10. As shown, the extendable member 12, the first extendable member 13 and the second extendable member 15 may be extended into place in a telescopic manner from the pivot joint 17 outward. When the arm 41 has been extended to the desired length, the arm 41 may be locked into place by rotating the first extendable member 13 and rotating the second extendable member 15 into a locked position. To release the arm 41, the first extendable member 13 and the second extendable member 15 are rotated in the opposite direction to disengage the lock so that the arm 41 can be retracted for storage and or manipulation. It is further contemplated that various other mechanisms for locking the arm 41 in place are possible in accordance with this invention.

Also shown is a mechanism for biasing the arm 41 in a retracted position. The retractable mechanism includes an extendable line 39 disposed internal to the arm 41. The extendable line 39 is urged to be retracted into the pivot joint 17 by a biased reel 43. Thus, when the arm 41 is unlocked, the arm will retract under the bias force being provided by the biased reel 43 to close the arm 41.

Figure 16:
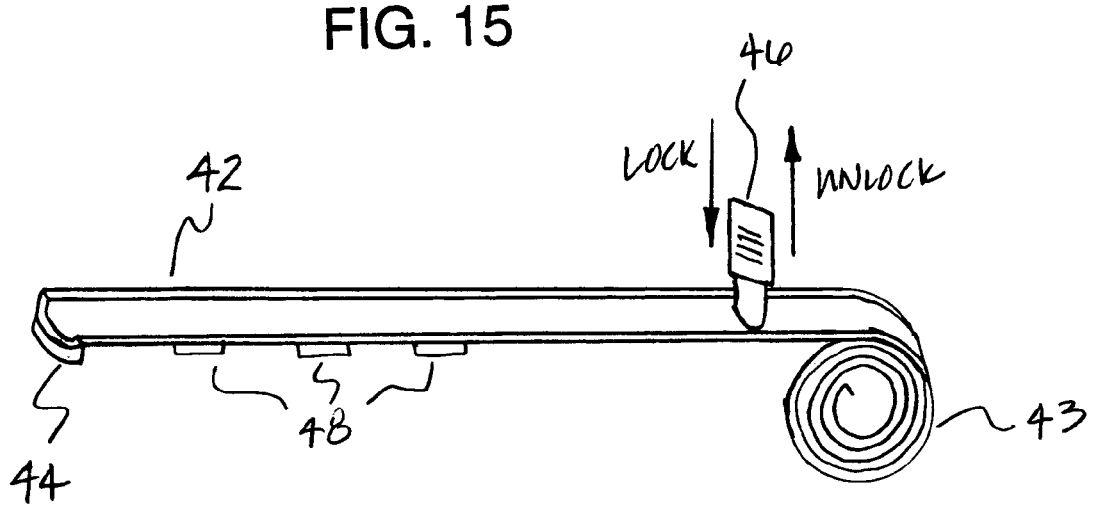
FIG. 16 demonstrates the cross section of an extendable member of the three dimensional measurement devices for measuring the circumference of a curved object in accordance with this invention.

FIG. 16 demonstrates another exemplary embodiment for the extendable measurement arm 42. As is known with conventional one-dimensional measuring tapes, the measuring tape arm 42 may be extended and retracted in and out of a housing and about a biased reel 43. A locking mechanism may be disposed that clamps the extendable measurement arm 42 in a fixed position while measurements are being taken. In a first locked position, the locking mechanism 46 is secured against the extendable measurement arm 42 to hold the extendable measurement arm 42 in a fixed position. In a second unlocked position, the locking mechanism 46 is released from against the extendable measurement arm 42 and the extendable measurement arm 42 is free to move in and out of the three dimensional measuring device 10.

As shown in FIG. 16, the cross section of an extendable member of the three dimensional measurement device 10 for measuring the circumference of a curved object is curved in nature to provide enhance rigidity when the extendable measurement arm 42 is extended in accordance with this invention. When biased curve shape in the extendable measurement arm 42 is overcome, the extendable measurement arm 42 has the tendency to flex around a curved object.

FIG. 16 also shows a retainer for allowing the extendable measurement arm 42 to hook against an end surface being measured. Although shown as a hook, the retaining member may be made from a plurality of different retainers now known or later developed in accordance with this invention. Referring back to FIG. 14, as shown and described in this figure, the retainer may be a connector piece that allows at least two three dimensional measuring device 10 to fasten to each other.

Another aspect of this invention is to integrate an internal measurement mechanism that measures the distance of the extendable measurement arm 42 that has been unreeled from a spool in the reel. The three dimensional measuring device 10 may include a sensing device adjacent to the reel 43 that will measure the amount of tape unreeled and the distance that corresponds to that amount of tape. The advantage of this type of measurement is that the tabulation of the distance dimension is electronically determined and the results can be displayed on the display. Likewise, the internal processor can use the various dimensions recorded to determine other important values, such as the circumference of an object, the volume of the measured device, and the like. Numerous advantages may be sought from this invention.

Figure 21:
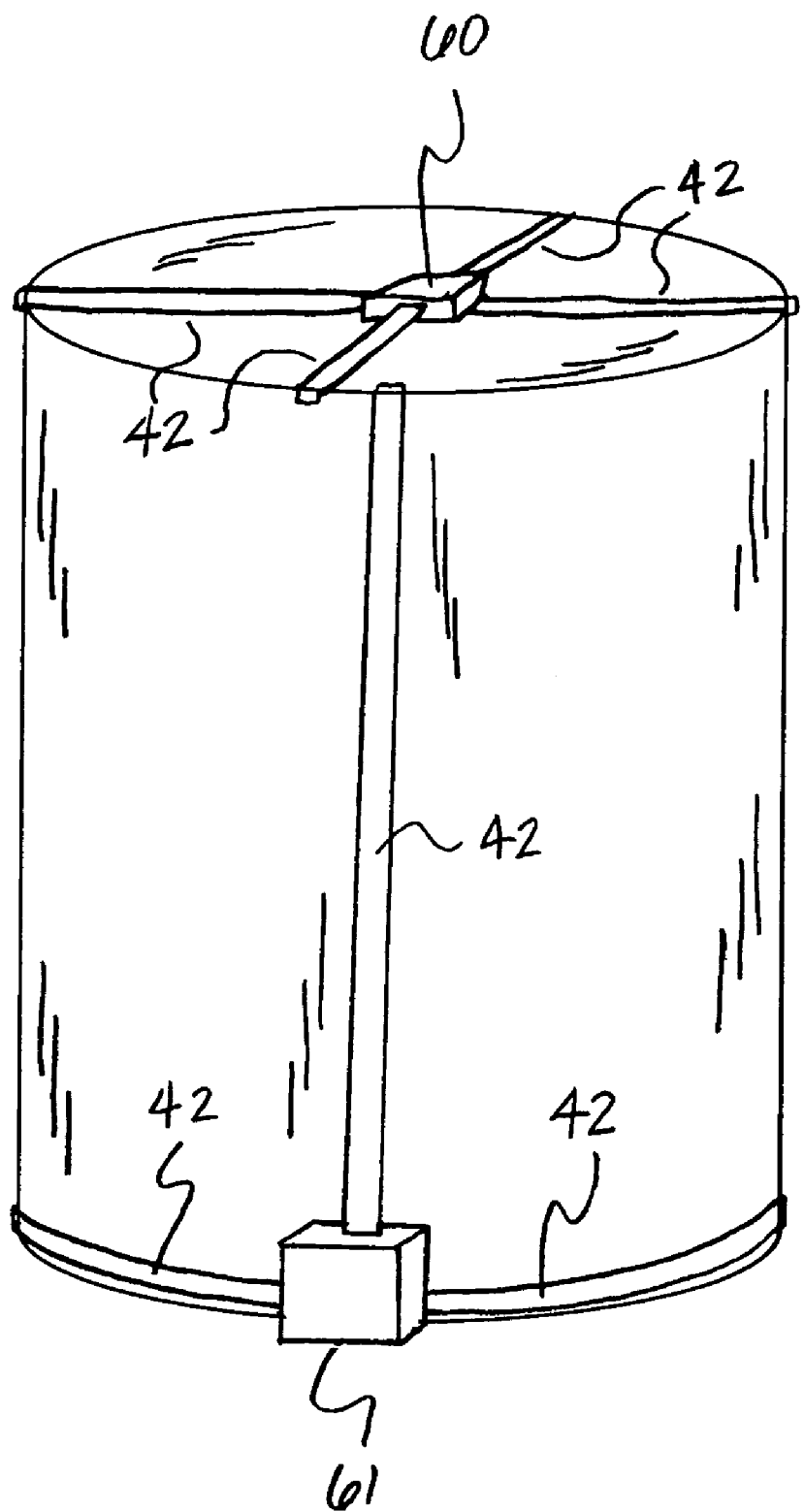
FIG. 21 illustrates the use of the modular three dimensional measurement device measuring a curved object in accordance with this invention.

Yet another aspect of this invention is to integrate a securing device 48 on at least one surface of the extendable measurement arm 42. The advantage of embedding the securing device 48 is so that as the extendable measurement arm 42 is extended, the surface of the extendable measurement arm 42 that includes the securing mechanism 48, may be fastened to the surface of the object being measured. For example, FIG. 21 illustrates the circumference of the circular object being measured by the extendable measurement arm 42. As the extendable measurement arm 42 is unreeled and extended, the securing mechanism may be adhered to the surface of the circular member to allow the extendable measurement arm 42 to lie as flat as possible to the surface and to yield an optimum dimension. This is also an advantage where the measurement taken is at some height above the ground when the force of gravity would tend to skew an accurate result. Using the securing device along the surface secures the extendable measurement arm 42 as close as possible thereby rendering an accurate dimension.

Another example in which providing a securing device would be an advantage is measuring height objects such as the height of a ceiling in a home. Optimally, it would now be possible to easily measure the wall's western measurement (width), the eastern measurement (width), northern and southern measurements (height) and even the depth measurement.

Figure 17:
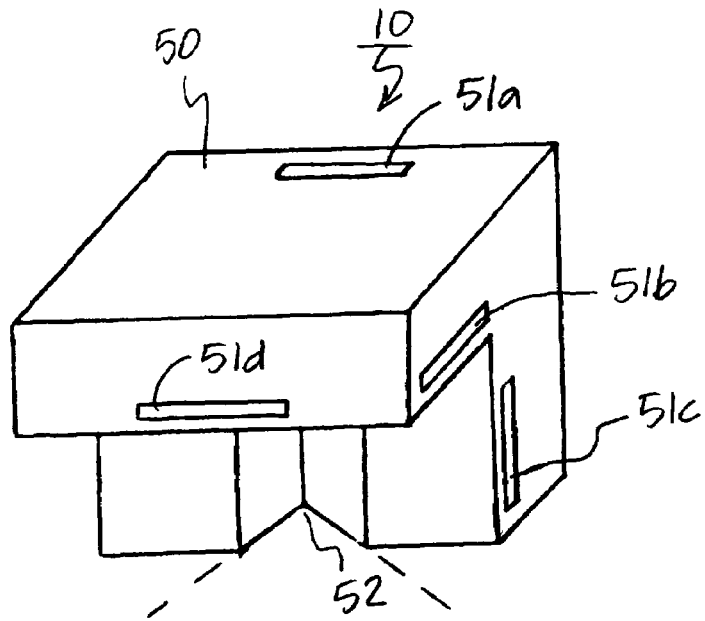
FIG. 17 illustrates another exemplary compact arrangement for the three dimensional measurement devices in accordance with this invention.

FIG. 17 illustrates another exemplary compact arrangement for the three-dimensional measurement device 10 in accordance with this invention. The rigid body 50 includes passages 51a-51d that allows an extendible member to pass for use of measurement. It should be recognized that the passages 51a-51d can be placed in any position that is optimal for measurement and are shown in these positions for illustrative purposes. Rigid body 50 also includes channel 52 that allows the rigid body 50 to be placed at a corner position of a furniture piece for measurement.

Figure 18:
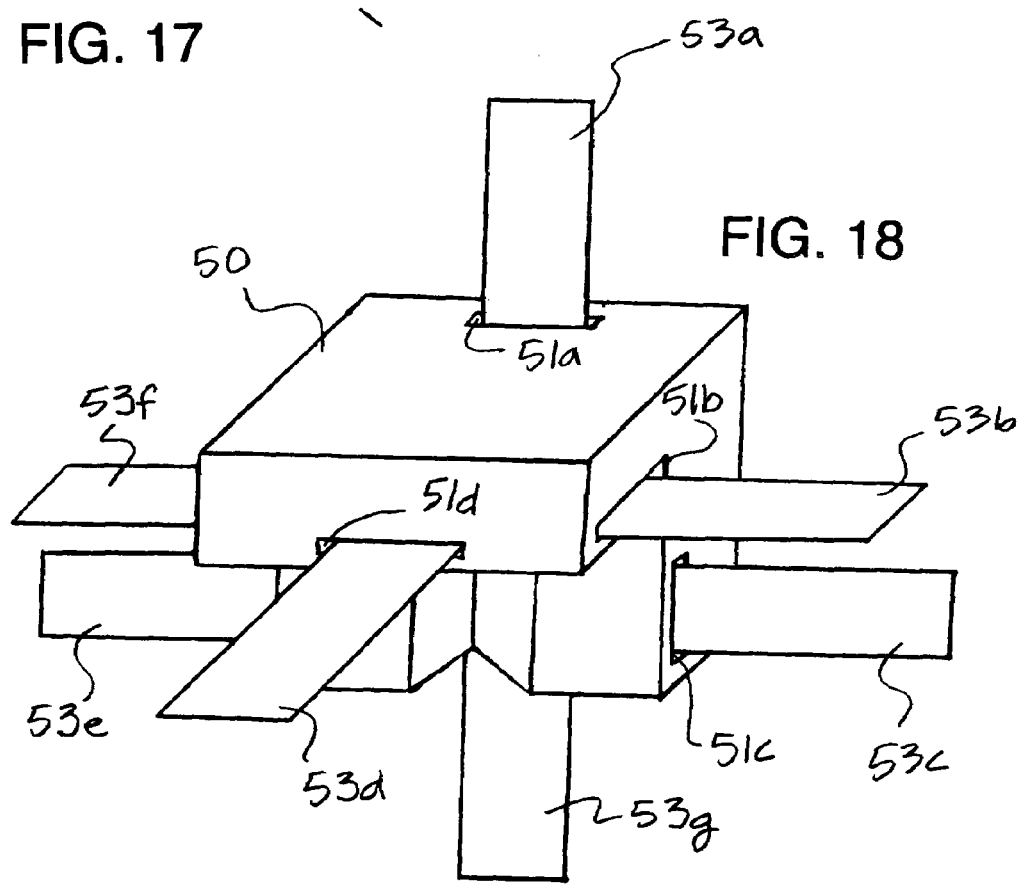
FIG. 18 illustrates the exemplary compact arrangement for the three dimensional measurement device with extendable members extending therefrom in accordance with this invention.

FIG. 18 illustrates the exemplary compact arrangement for the three dimensional measurement device with extendable members 53a-53f extending there from in accordance with this invention. The rigid body 50 includes passages 51a-51d that allows extendible members 53a-53d to pass for use of measurement. The illustration also shows extendible members 53e-53g that pass from other passages not shown in the illustration due to the orientation of the drawings. It should be considered that extendible members 53a-g may be made from a variety of different material, including but not limited to: flexible metal, paper, fabric, etc. without departing from the scope of this invention. Alternatively, the extendible members 53a-g may be made from a plurality of flexible magnetic portions fastened together.

Figure 19:
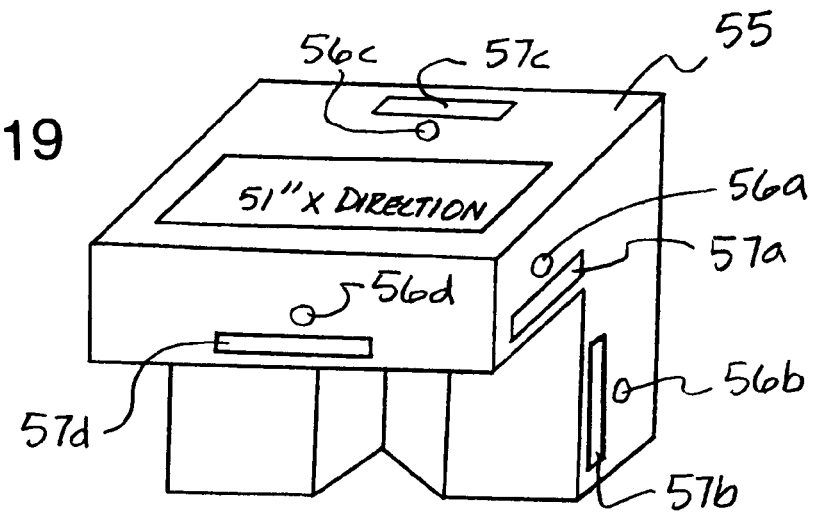
FIG. 19 illustrates the three dimensional measurement device including a display and an embedded laser measurement system according to this invention.

FIG. 19 illustrates the three dimensional measurement device including a display and an embedded laser measurement system according to this invention. The rigid body 55 includes passages 57a-57d that allow a laser beam to pass from the rigid body 55 and return to take a measurement distance. The laser measurement beam can be implemented with laser measurement systems already known in the art. For example, in operation, when the user desires to take a first dimension in an X-direction, he would initiate the measurement by selecting the X dimension switch 56a. A signal would be transmitted to a processor to take an X-measurement and the processor would send instructions to a laser transmitter to activate the X-laser. The X-laser would then transmit the laser out to the object in line with the longitudinal axis of the passage 57a. The light illuminated by the laser would be reflected back from the object that the laser is striking back to the X-laser which would incorporate a light sensor. The return illumination source would be transmitted to the laser transmitter and a processor would determine the distance that the impeding object is away from the X-laser to yield an X distance. Likewise, all of the measurements from each of the passages 57a-57d, and the like, would be determined similarly. The display 58 may be user as a user interface, either with a plurality of buttons or a touch screen for operating the various dimensional measurements. The display can also display the results of the measurements. The results may be stored in memory for use or review at a later time. A processor can display the measurements in any type of measurement units, including for example US standards or according to the metric system.

Figure 20:
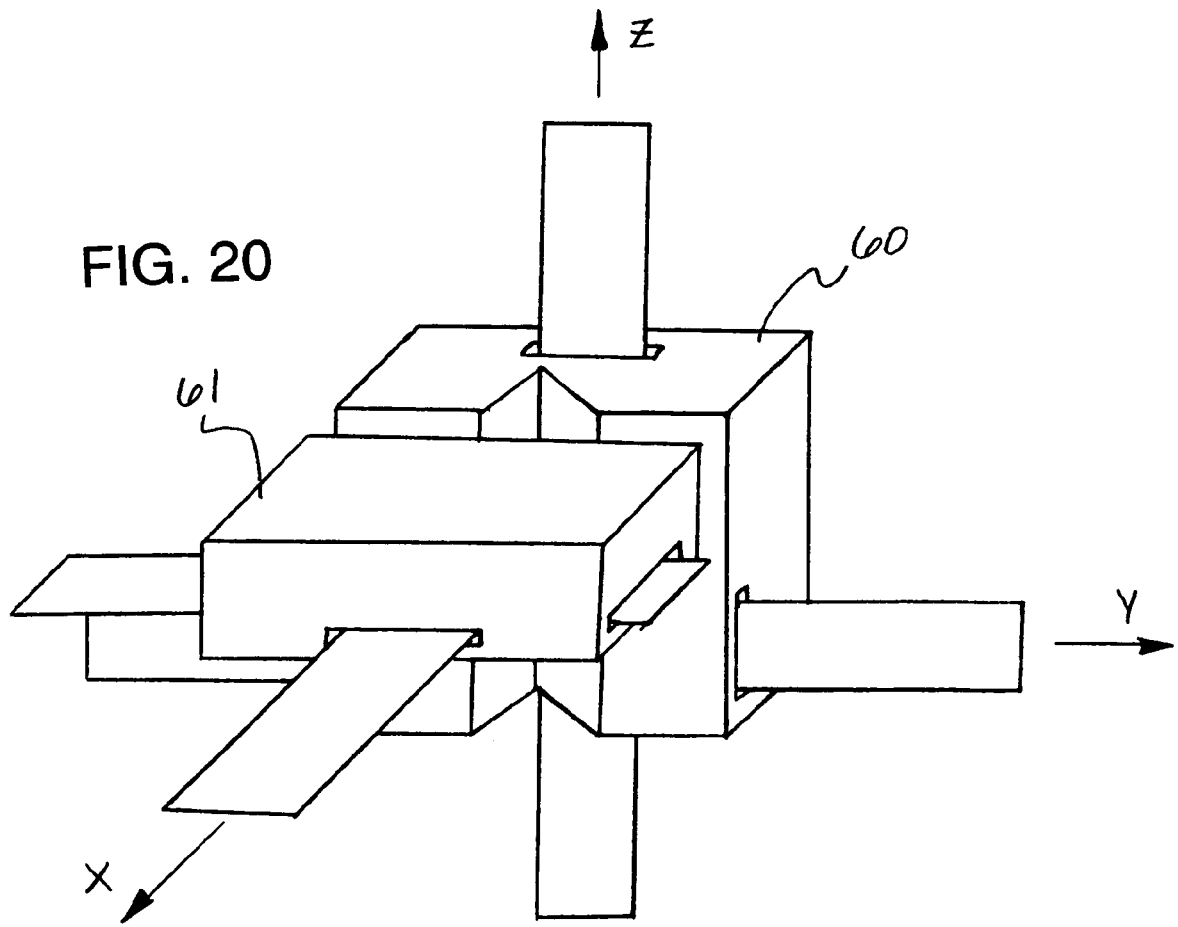
FIG. 20 illustrates the modular arrangement for the three dimensional measurement devices according to this invention.

FIG. 20 illustrates the modular arrangement for the three dimensional measurement devices according to this invention. The rigid body 60 can be detachable from the rigid body 61 to take measurements which do not require measurements in a direction that oppose the X-Y plane.

As an exemplary illustration as to the use of the rigid bodies 60 and 61 shown in FIG. 20, FIG. 21 illustrates the use of the modular three dimensional measurement device measuring a curved object in accordance with this invention. It should be recognized that many objects may be measured using this method without departing from the scope of this invention. As shown, through the use of the modular three dimensional measuring device the rigid bodies 60 and 61 may be separated to obtain optimal measurement. The processor 35 in the three dimensional measuring device 10 will record the dimensions. The advantage of this embodiment is that at least two locations can simultaneously be measured. The measurement information collected by the rigid bodies 60, 61 may be communicated to a centrally located processor 35. The rigid bodies may communicate with each other through a variety of different wireless interfaces, such as for example, Bluetooth, RF, Infrared, and the like.

According to another exemplary embodiment, as the rigid bodies communicate with each other it is possible for the measurement information to be communicated to a PC device such that a 3D modeling program can reproduce a scaled representation of the object. This allows an interior designer to use recreate a project room with actual representations of the sizes and shapes of objects. It should also be recognized that each of the rigid bodies 60 and 61 may be attachable to the surface of an object being measured using an attaching method such as tacks, double sided tape, Velcro and the like so that measurements may be taken at varying heights without the need for a second user.

It should also be considered that, although the illustration depicts that rigid bodies 60 and 61 attach to each other in orthogonal and parallel directions, the rigid bodies may contain pivot points that make them attachable at angles. Using this method, measurements can be taken at angles away from the X-Y surface in a Z direction.

Figure 22:
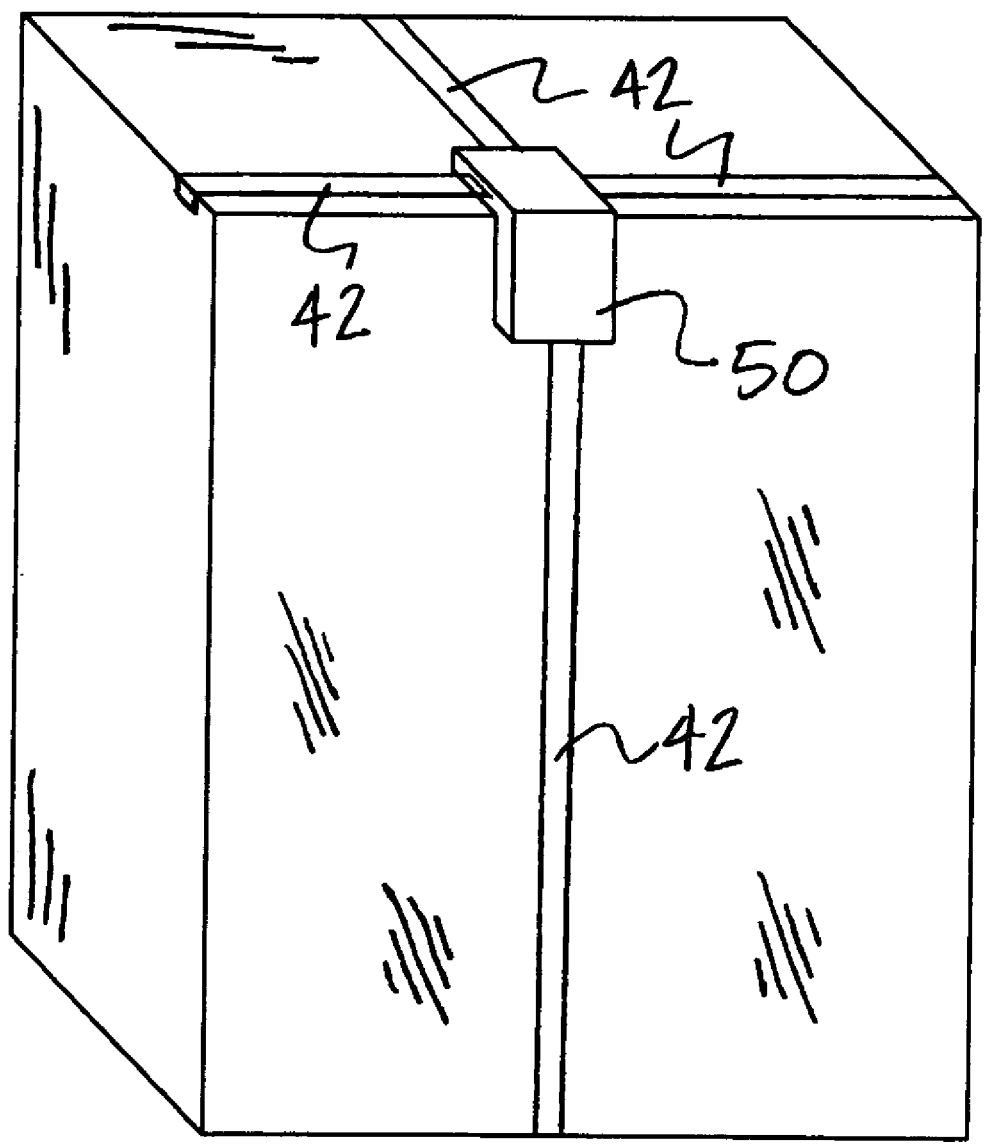
FIG. 22 illustrates the use of the modular three dimensional measurement device measuring an object with flat sides in accordance with this invention.
Figure 23:
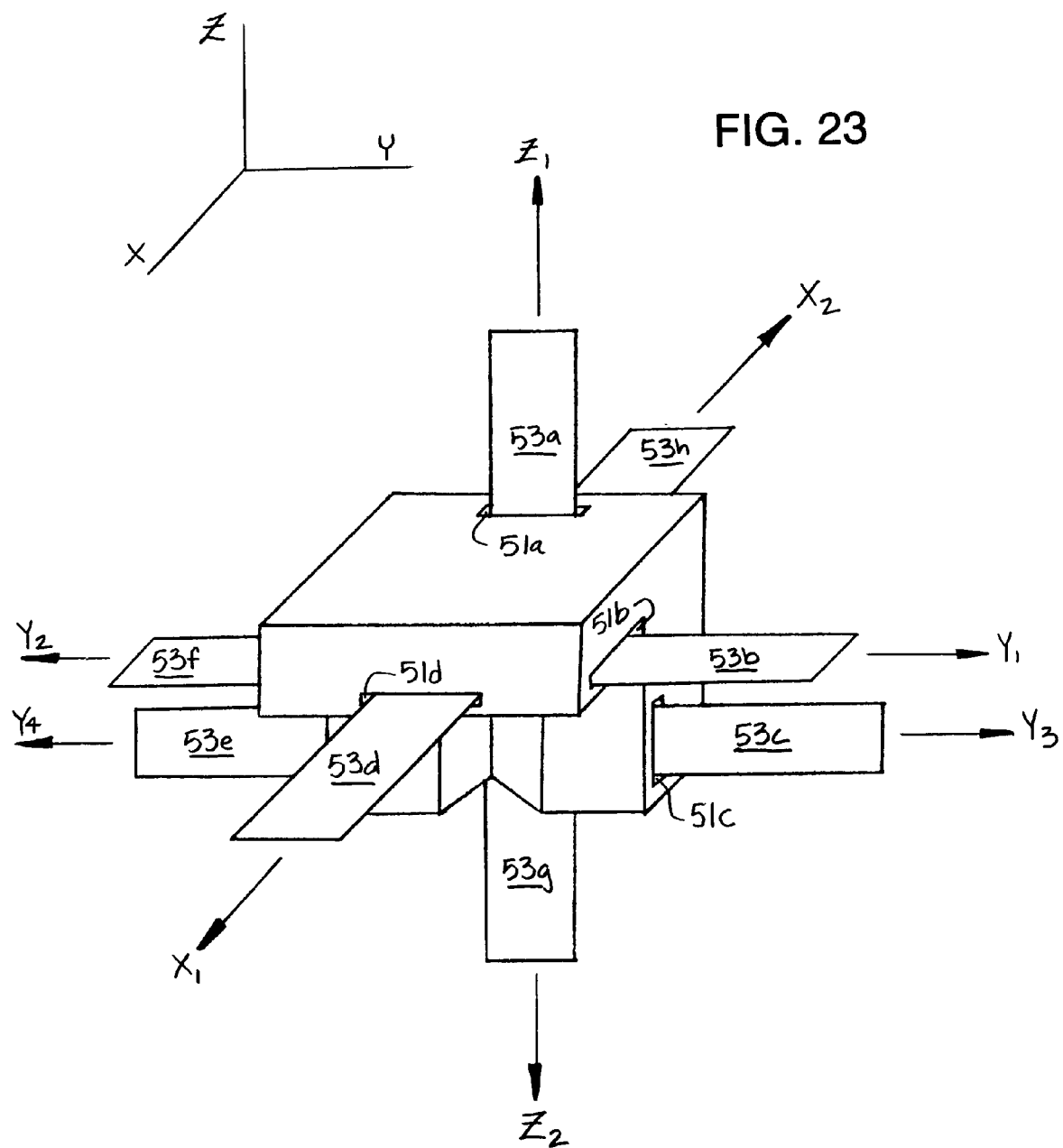
FIG. 23 illustrates the exemplary perspective arrangement for an exemplary three dimensional measurement device depicting the orientation of various extendable members relative to various axes in accordance with this invention.

FIG. 22 illustrates the use of the modular three dimensional measurement device 50, shown in FIGS. 18, 19 and 20 measuring an object with flat sides in accordance with this invention. Each of the sides of the object may be measured simultaneously and that data may be centrally stored in the internally memory and recalled at a later date as necessary. The advantage of this system over conventional one-dimensional measurement devices is that more accurate measurements may be taken because all of the desired dimensions for the object may be taken simultaneously while the three dimensional measuring device 10 is securely fastened to the object. The secure fit to the object reduces the inherent measurement variances that occur when a user measures one side at a time.

FIGS. 23 through 28 depict an exemplary three dimensional measurement device illustrating the orientation of various extendible members 53a-53d relative to the X-axis, Y-axis and Z-axis shown.

Along the X-axis, extendible member 53d extends from tape reel 43d (as shown in FIGS. 25, 27) within rigid block 50 through passage 51d in a positive X-axis direction (defined $X_1$). The extendible member 53h extends from tape reel 43h (as shown in FIGS. 25, 27) within rigid block 50 through passage 51h (not shown) in a negative X-axis direction (defined $X_2$).

Along the Y-axis, extendible member 53b extends from tape reel 43b (as shown in FIGS. 24, 25, 27) within rigid block 50 through passage 51b in a positive Y-axis direction (defined $Y_1$). The extendible member 53f extends from tape reel 43f (as shown in FIGS. 24, 25, 26) within rigid block 50 through passage 51f (not shown) in a negative Y-axis direction (defined $Y_2$).

Two additional extendable members 53c and 53e also extend along the Y-axis. That is, extendible member 53c extends from tape reel 43c (as best shown in FIGS. 24, 27, 28) within rigid block 50 through passage 51c in a positive Y-axis direction (defined $Y_3$). The extendible member 53e extends from tape reel 43e (as best shown in FIGS. 24, 26, 28) within rigid block 50 through passage 51e (not shown) in a negative Y-axis direction (defined $Y_4$).

Along the Z-axis, extendible member 53a extends from tape reel 43a (as best shown in FIGS. 25, 28) within rigid block 50 through passage 51a in a positive Z-axis direction (defined $Z_1$). The extendible member 53g extends from tape reel 43g (as best shown in FIGS. 25, 28) within rigid block 50 through passage 51g (not shown) in a negative Z-axis direction (defined $Z_2$).

It is to be understood that the tape reel arrangement shown is not intended to be limited and may be modified in a number of various arrangements in accordance with this invention.

Figures 29, 30, 31, 32:
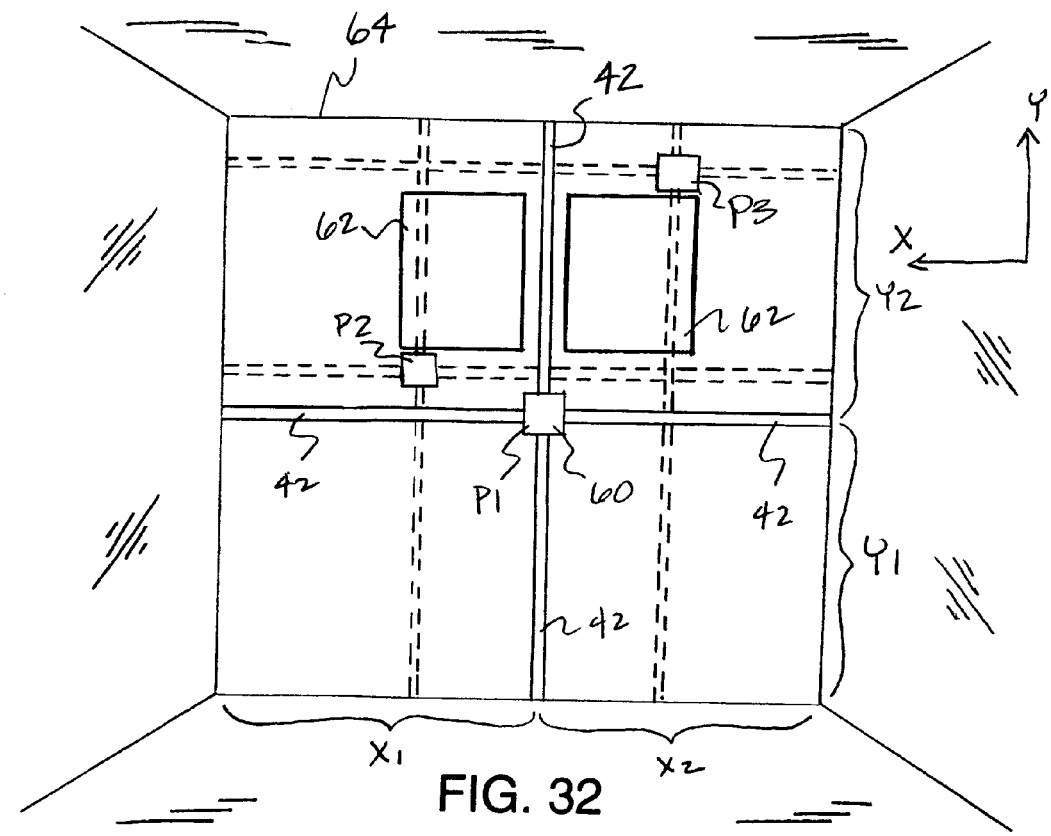
FIGS. 29-31 illustrate a configuration of a display unit usable with the modular three dimensional measuring device in three different positions in accordance with this invention.
FIG. 32 illustrates the three dimensional measuring device establishing a relative alignment of pictures about a wall in accordance with this invention.

FIGS. 29-31 illustrate a configuration of a display unit usable with still another use of the modular three dimensional measuring device 60 as shown in FIG. 32. FIGS. 29-31 display measurement coordinates of the relative position of the rigid body 60 shown in FIG. 32. For example, the X1, X2, Y1 and Y2 coordinates shown in FIG. 29 correspond to the position of rigid body 60 when in position P1 (shown in FIG. 24). The X1, X2, Y1 and Y2 coordinates shown in FIG. 30 correspond to the position of rigid body 60 when in position P2. Finally, the X1, X2, Y1 and Y2 coordinates shown in FIG. 31 correspond to the position of rigid body 60 when in position P3.

In use, as shown in FIG. 32, a user may want to determine the relative optimal positions of pictures 62 along wall 64. By attaching extendable members 42 to the surface of wall 64 using any means described above, the user can take coordinate measurements of pictures 62. For example, if the user wanted to place pictures 62 in a centered position along wall 64, the user can place the rigid body 60 at P1 to determine the center of the wall. The user can determine the center of the wall 62 by comparing where the X1 and X2 coordinates shown on the display are equal. The user can also determine the height mid point of the wall where the Y1 and Y2 coordinates are equal. This relative position can be recorded by the rigid body 60 in a manner described above with respect to the memory means. To determine the best positions of the outer edges of pictures 62, the user may then place the rigid body 60 at positions P2 and P3. Using this information, the user can determine the optimal locations of pictures 62. Various other possibilities for positioning objects in a room or on a wall may be performed in accordance with this invention.

The three dimensional measuring device has numerous widespread applications. For example, it is contemplated within the scope of this invention to incorporate the three dimensional measuring device in combination with a scale function such that it would also be possible to accurately determine the weight of the object being measured with the use of the three dimensional measuring device. The three dimensional measuring device integrated with a scale may be useful for business or personal use applications. For example, if a user desires to mail an object package, various types of information about the dimensions and weight of the package are necessary and difficult to guess.

In preparing the package for postage and delivery, it is possible to accurately determine the shape, volume and weight of the object package. Since shipping costs has a direct relation to the size and weight of the object, the object may be placed onto the three dimensional measuring device embedded with a scale function to accurately measure the shape, volume and weight of the object. The advantage of providing this feature and functionality is that less time would be wasted at the mail center when a user is preparing a package for delivery.

Likewise, the three dimensional measuring device may also include a stamp dispensing feature and functionality in which the three dimensional measuring device can accurately and automatically dispense stamps for the package in preparation of mail delivery. Currently, stamp dispensing machines have the capacity to weigh packages but they do not have the capacity to accurately determine the volume and dimensions of a package in an efficient and low cost manner.

The illustrations and examples provided herein are for explanatory purposes and are not intended to limit the scope of the appended claims. It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed:

1. A three dimensional measurement device for taking linear measurements comprising:
    a first retractable member connected at a pivot joint for measuring a first dimension in a first plane;
    a second retractable member connected at the pivot joint for measuring a second dimension in the first plane; and
    a third retractable member connected at the pivot joint for measuring a third dimension in a second plane.

2. The three dimensional measuring device as recited in claim 1, wherein at least one of the first, second and third retractable members is telescopic and includes at least a first extension member and a second extension member.

3. The three dimensional measuring device as recited in claim 1, wherein at least one of the first, second and third retractable members is a retractable tape reel compactly wound within the body of a housing of the three dimensional measuring device.

4. The three dimensional measuring device as recited in claim 1, wherein the at least one of the first, second and third members further comprises:
    a distance sensing device adapted to measure a distance when at least one of the ends of the retractable members is extended;
    a locking mechanism to secure the retractable member in a predetermined position; and
    a return mechanism biased to close the retractable member when the locking mechanism is disengaged.

5. The three dimensional measuring device as recited in claim 1, wherein incremental measurement indicators are labeled on at least one of the retractable members.

6. The three dimensional measuring device as recited in claim 1, wherein the first retractable member, the second retractable member, and the third retractable members are connected at the pivot joint that enables three dimensional angular motion for each of the retractable members.

7. The three dimensional measuring device as recited in claim 6, wherein an angular protractor is provided to determine an angular measurement selected between any two of the first, second and third retractable members.

8. The three dimensional measuring device as recited in claim 1, wherein at least one of the retractable members includes a fastener adapted to secure an end of the retractable member in a predetermined position as a measurement is taken.

9. The three dimensional measuring device as recited in claim 1, further including more than three retractable members for measuring additional dimensions.

10. The three dimensional measuring device as recited in claim 1, wherein the various linear measurements are determined by a laser measurement distance device.

11. The three dimensional measuring device as recited in claim 1, wherein at least two of the three dimensional measuring devices can simulate a three dimensional model of an object by fastening the ends of the retractable members of the three dimensional measuring devices to each other.

12. A method for measuring three dimensions, comprising:
   measuring a first dimension in a first direction on a first plane with a first retractable member connected to a pivot joint;
   measuring a second dimension in a second direction on the first plane with a second retractable member connected to the pivot joint; and
   measuring a third dimension in a third direction on a second plane with a third retractable member connected to the pivot joint.

13. The method for measuring three dimensions as recited in claim 12, further comprising:
   processing the determined first, second and third dimensions; and
   displaying the results of the first, second and third dimensions on a display.

14. The method for measuring three dimensions as recited in claim 12, further comprising:
   processing the first, second and third dimensions; and
   determining various parameters for an object defined by the determined first, second and third dimensions received; and
   displaying the various parameters associated with the object.

15. A three dimensional measurement device for taking linear measurements comprising:
   a housing constructed to lie adjacent to an object for measurement thereof, including various passages through which at least one of a first retractable member, a second retractable member, and a third retractable member pass, wherein:
   the first retractable member measures a first dimension in a first direction in a first plane;
   the second retractable member measures a second dimension in a second direction in the first plane; and
   the third retractable member measures a third dimension in a third direction in a second plane.

16. The three dimensional measuring device recited in claim 15, further comprising:
   a display; and
   an embedded laser distance measurement system adapted to determine distance measurements in at least one of a first, second and third direction.

17. The three dimensional measuring device recited in claim 15, wherein the housing is modularly constructed to be separated into a first housing portion and a second housing portion wherein,
   the first housing portion can collect three dimensional distance measurements at a first location, and
   the second housing portion can collect additional three dimensional distance measurements at a second location.

18. The three dimensional measuring device recited in claim 15, wherein the various three dimensional distance measurements collected by the first housing portion and the second housing portion are communicated between each other and stored in a processor.

19. The three dimensional measuring device recited in claim 15, wherein the three dimensional measuring device can be used to determine two dimensional measurements in a plane.

20. The three dimensional measuring device recited in claim 15, wherein the retractable members of the three dimensional measuring device are locking members.

* * * * *